(12) United States Patent
Tsukagoshi

(10) Patent No.: US 10,659,795 B2
(45) Date of Patent: May 19, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,086

(22) PCT Filed: Mar. 16, 2017

(86) PCT No.: PCT/JP2017/010795
§ 371 (c)(1),
(2) Date: Aug. 21, 2018

(87) PCT Pub. No.: WO2017/164087
PCT Pub. Date: Sep. 28, 2017

(65) Prior Publication Data
US 2019/0052889 A1 Feb. 14, 2019

(30) Foreign Application Priority Data

Mar. 24, 2016 (JP) ................................. 2016-060956

(51) Int. Cl.
*H04N 19/31* (2014.01)
*H04N 21/236* (2011.01)
(Continued)

(52) U.S. Cl.
CPC .......... *H04N 19/31* (2014.11); *H04N 7/0112* (2013.01); *H04N 19/70* (2014.11); *H04N 21/236* (2013.01);
(Continued)

(58) Field of Classification Search
CPC .... H04N 19/31; H04N 19/70; H04N 21/2343; H04N 21/234381; H04N 21/236; H04N 21/440281; H04N 7/0112
See application file for complete search history.

(56) References Cited

U.S. PATENT DOCUMENTS

| | | | |
|---|---|---|---|
| 2008/0019438 A1* | 1/2008 | Takahashi | H04N 19/70 375/240 |
| 2014/0036148 A1* | 2/2014 | Tanigawa | H04N 7/0127 348/448 |

FOREIGN PATENT DOCUMENTS

| | | |
|---|---|---|
| JP | 2005-354361 A | 12/2005 |
| JP | 2012-227799 A | 11/2012 |

(Continued)

OTHER PUBLICATIONS

Extended European Search Report dated Dec. 7, 2018 in Patent Application No. 17770129.9, 8 pages.

(Continued)

*Primary Examiner* — Sath V Perungavoor
*Assistant Examiner* — Tyler B Edwards
(74) *Attorney, Agent, or Firm* — Oblon, McClelland, Maier & Neustadt, L.L.P.

(57) ABSTRACT

For example, 120 Hz display can be favorably performed on a reception side even in the case of encoding and transmitting moving image data of 24 Hz at the frame rate of 60 Hz. A video stream of a second frame rate larger than a first frame rate is obtained by encoding each picture constituting moving image data of the first frame rate at the second frame rate. Identification information indicating a synchronization relationship between the first frame rate and display start timing is inserted into encoded image data of each picture constituting the video stream of the second frame rate.

(Continued)

The video stream of the second frame rate in which the identification information is inserted is transmitted.

9 Claims, 22 Drawing Sheets

(51) Int. Cl.
    *H04N 21/2343*     (2011.01)
    *H04N 19/70*     (2014.01)
    *H04N 7/01*     (2006.01)
    *H04N 21/4402*     (2011.01)

(52) U.S. Cl.
    CPC . *H04N 21/2343* (2013.01); *H04N 21/234381* (2013.01); *H04N 21/440281* (2013.01)

(56) References Cited

FOREIGN PATENT DOCUMENTS

| | | | |
|---|---|---|---|
| JP | 2012227799 A | * | 11/2012 |
| JP | 2013-143646 A | | 7/2013 |
| WO | WO 2012/137269 A1 | | 10/2012 |

OTHER PUBLICATIONS

Li, M. et al. "Proposed updates to PDAM4—Transport of HEVC video over MPEG-2 Systems" International Organisation for Standardisation Organisation Internationale de Normalisation ISO/IEC JTC1/SC29/WG11 Coding of Moving Pictures and Audio, XP030057738, 2013, 18 pages.

International Search Report dated Jun. 20, 2017 in PCT/JP2017/010795 filed Mar. 16, 2017.

* cited by examiner

FIG. 8

| | Descriptor |
|---|---|
| pic_timing( payloadSize ) { | |
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_hrd_params_present_flag ) | |
|       pic_dpb_output_du_delay | u(v) |
|     if( sub_pic_hrd_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i | |
|           < num_decoding_units_minus1 ) | |
|           du_cpb_removal_delay_increment_minus1[ i ] | u(v) |
|       } | |
|     } | |
|   } | |
| } | |

FIG. 9

Interpretation of pic_struct

| Value | Indicated display of picture | Restriction |
|---|---|---|
| 0 | (progressive)frame | field_seq_flag shall be 0 |
| 1 | top field | field_seq_flag shall be 1 |
| 2 | bottom field | field_seq_flag shall be 1 |
| 3 | top field, bottom field, in that order | field_seq_flag shall be 0 |
| 4 | bottom field, top field, in that order | field_seq_flag shall be 0 |
| 5 | top field, bottom field, top field repeated, in that order | field_seq_flag shall be 0 |
| 6 | bottom field, top field, bottom field repeated, in that order | field_seq_flag shall be 0 |
| 7 | frame doubling | field_seq_flag shall be 0<br>fixed_pic_rate_within_cvs_flag shall be 1 |
| 8 | frame tripling | field_seq_flag shall be 0<br>fixed_pic_rate_within_cvs_flag shall be 1 |
| 9 | top field paired with previous bottom field in output order | field_seq_flag shall be 1 |
| 10 | bottom field paired with previous top field in output order | field_seq_flag shall be 1 |
| 11 | top field paired with next bottom field in output order | field_seq_flag shall be 1 |
| 12 | bottom field paired with next top field in output order | field_seq_flag shall be 1 |

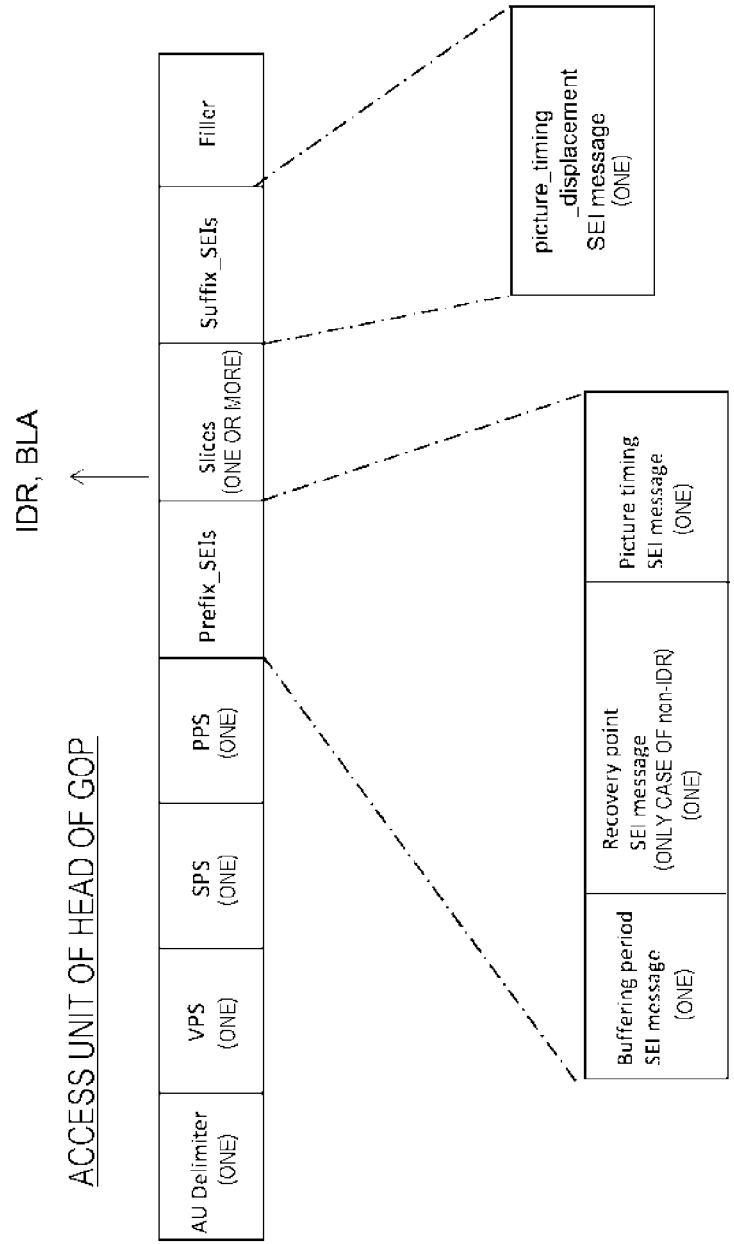

SEI ARRANGEMENT EXAMPLE AS HEVC ENCODED STREAM

FIG. 12

Picture_timing_displacement SEI (a)

| Syntax | No. of Bits | format |
|---|---|---|
| picture_timing_displacement SEI(){ | | |
|   picture_timing_displacement_SEI_id | | ue(v) |
|   resync_to_picstruct_flag | 1 | bslbf |
|   early_display_flag | 1 | bslbf |
|   late_display_flag | 1 | bslbf |
|   reserved | 5 | bslbf |
| } | | |

(b)

semantics resync_to_picstruct_flag (1bit)
  1    STARTING POINTS OF REPEAT INDICATED BY pic_struct AND THE 24Hz SYNCHRONIZATION POSSIBLE IF RE-ENCODING IS PERFORMED EARLIER THAN THE NUMBER OF FRAME REPEATS INDICATED BY PREVIOUS pic_struct
  0    STARTING POINTS OF REPEAT INDICATED BY pic_struct AND THE 24Hz SYNCHRONIZATION ARE NOT SAME early_display_flag (1bit)
  1    VIDEO AND THE 24Hz SYNCHRONIZATION POSSIBLE IF RE-ENCODING IS PERFORMED EARLIER THAN THE NUMBER OF FRAME REPEATS INDICATED BY PREVIOUS pic_struct
  0    OTHERS late_display_flag (1bit)
  1    VIDEO AND THE 24Hz SYNCHRONIZATION POSSIBLE IF RE-ENCODING IS PERFORMED LATER THAN THE NUMBER OF FRAME REPEATS INDICATED BY PREVIOUS pic_struct
  0    OTHERS

FIG. 16

| Original Frame Rate (Hz) | Display Frame Rate (Hz) | Frame Repeat At Display Rate | Encoding Frame Rate (Hz) | Num of pictures to Shift Timing |
|---|---|---|---|---|
| 24 | 120 | 5 | 60 | 1 |
| 24 | 240 | 10 | 60 | 2 |
| 48 | 240 | 5 | 120 | 1 |

{Frame Repeat at Display Rate} = {Display Frame Rate} / {Original Frame Rate} ... (1)

{Num of pictures to Shift Timing} = {Display Frame Rate} / {Encoding Frame Rate * 2} ... (2)

FIG. 17

Picture_timing_displacement SEI (a)

| Syntax | No. of Bits | format |
|---|---|---|
| picture_timing_displacement SEI(){ | | |
| picture_timing_displacement_SEI_id | | ue(v) |
| resync_to_picstruct_flag | 1 | bslbf |
| reserved | 7 | bslbf |
| } | | | semantics (b)

resync_to_picstruct_flag (1bit)
1    STARTING POINT OF REPEAT INDICATED BY pic_struct AND TIMING OF 24Hz MATERIAL ARE SAME
0    STARTING POINT OF REPEAT INDICATED BY pic_struct AND TIMING OF 24Hz MATERIAL ARE NOT SAME

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method. More specifically, the present technology relates to a transmission device and the like for encoding moving image data of a low frame rate at a frame rate larger than the low frame rate and transmitting the encoded moving image data.

BACKGROUND ART

Conventionally, to improve the image quality in a display device, converting data at a high frame rate and displaying the converted data on a reception side is known (for example, Patent Document 1). Further, conventionally, for example, encoding moving image data of 24 Hz at the frame rate of 60 Hz and transmitting the encoded data, and performing 3-2 pulldown display repeat and reproducing display of 60 Hz on the reception side is known. In this case, three-time repeat and two-time repeat are alternately repeated. Therefore, a viewer perceives so-called judder that a motion looks unnatural in a moving scene, for example.

CITATION LIST

Patent Document

Patent Document 1: Japanese Patent Application Laid-Open No. 2013-143646

SUMMARY OF THE INVENTION

Problems to be Solved by the Invention

In the case of encoding and transmitting the moving image data of 24 Hz at the frame rate of 120 Hz, display reproduction of 120 Hz becomes possible without impairing the smoothness of the material by repetition of five-time repeat on the reception side because 120 Hz is the integral multiple of 24 Hz.

An object of the present technology is to enable favorable 120 Hz display on the reception side even in the case of encoding and transmitting moving image data of 24 Hz at the frame rate of 60 Hz, for example.

Solutions to Problems

The concept of the present technology is in a transmission device including:

an encoding unit configured to encode each picture constituting moving image data of a first frame rate at a second frame rate larger than the first frame rate to obtain a video stream of the second frame rate;

an information insertion unit configured to insert identification information indicating a synchronization relationship between the first frame rate and display start timing into encoded image data of the each picture constituting the video stream of the second frame rate; and a transmission unit configured to transmit the video stream of the second frame rate in which the identification information is inserted.

In the present technology, the each picture constituting the moving image data of the first frame rate is encoded at the second frame rate larger than the first frame rate, and the video stream of the second frame rate is obtained by the encoding unit. The identification information indicating the synchronization relationship between the first frame rate and the display start timing is inserted into the encoded image data of the each picture constituting the video stream of the second frame rate by the information insertion unit. The video stream of the second frame rate in which the identification information is inserted is transmitted by the transmission unit.

For example, it may be configured such that the information insertion unit inserts an SEI message including the identification information into the video stream of the second frame rate. Further, for example, it may be configured such that the identification information indicating a synchronization relationship includes identification information indicating whether being in synchronization with the first frame rate. Further, in this case, for example, it may be configured such that the identification information indicating a synchronization relationship further includes identification information indicating whether being advanced or delayed from the first frame rate when not being in synchronization with the first frame rate. Further, for example, it may be configured such that the first frame rate is 24 Hz and the second frame rate is 60 Hz, or the first frame rate is 48 Hz and the second frame rate is 120 Hz.

In this way, in the present technology, the identification information indicating the synchronization relationship between the first frame rate and the display start timing is inserted into the encoded image data of the each picture constituting the video stream of the second frame rate, and the encoded image data with the inserted identification information is transmitted. Therefore, a reception side can easily correct the display start timing of the image data of the each picture to the same state as in a case of encoding the each picture constituting the moving image data of the first frame rate at a third frame rate that is N times the first frame rate on the basis of the identification information, and can favorably perform display of the third frame rate without impairing the smoothness of the material of the first frame rate by performing display repeat processing for the image data of each picture the number of N times.

Further, another concept of the present technology is in a reception device including:

a reception unit configured to receive a video stream of a second frame rate larger than a first frame rate, the video stream having been obtained by encoding each picture constituting moving image data of the first frame rate at the second frame rate, and the reception device further including:

a control unit configured to control decoding processing of decoding encoded image data of the each picture constituting the video stream of the second frame rate to obtain image data of the each picture, timing correction processing of correcting display start timing of the image data of the each picture to a same state as in a case of encoding the each picture constituting the moving image data of the first frame rate at a third frame rate larger than the second frame rate and N times (N is an integer) the first frame rate, and display repeat processing of repeatedly outputting the image data of the each picture with the corrected display start timing at the third frame rate by the number of N times.

In the present technology, the video stream of the second frame rate is received by the reception unit. The video stream of the second frame rate is obtained by encoding the each picture constituting the moving image data of the first frame rate at the second frame rate larger than the first frame rate.

The decoding processing of decoding the encoded image data of the each picture constituting the video stream of the second frame rate to obtain the image data of the each picture is controlled by the control unit. Further, the timing correction processing of correcting the display start timing of the image data of the each picture to the same state as in the case of encoding the each picture constituting the moving image data of the first frame rate at the third frame rate larger than the second frame rate and N times (N is an integer) the first frame rate is controlled by the control unit. Further, the display repeat processing of repeatedly outputting the image data of the each picture with the corrected display start timing at the third frame rate by the number of N times is controlled by the control unit.

For example, it may be configured such that the first frame rate is 24 Hz, the second frame rate is 60 Hz, the third frame rate is 120 Hz, and the N is 5, the first frame rate is 24 Hz, the second frame rate is 60 Hz, the third frame rate is 240 Hz, and the N is 10, or the first frame rate is 48 Hz, the second frame rate is 120 Hz, the third frame rate is 240 Hz, and the N is 5.

In this way, in the present technology, the display repeat processing of correcting the display start timing of the image data of the each picture to the same state as in the case of encoding the each picture at the third frame rate that is N times the first frame rate, and repeatedly outputting the image data of the each picture with the corrected display start timing at the third frame rate by the number of N times is performed. Therefore, display of the third frame rate can be favorably performed without impairing the smoothness of the material of the first frame rate.

Note that, in the present technology, for example, it may be configured such that identification information indicating a synchronization relationship between the first frame rate and the display start timing is inserted in the encoded image data of the each picture constituting the video stream of the second frame rate, and the control unit controls the timing correction processing on the basis of the identification information indicating a synchronization relationship. In this case, for example, it may be configured such that the identification information indicating a synchronization relationship includes identification information indicating whether being in synchronization with the first frame rate. Further, in this case, for example, it may be configured such that the identification information indicating a synchronization relationship further includes identification information indicating whether being advanced or delayed from the first frame rate when not being in synchronization with the first frame rate.

In the case of handling a plurality of video streams of the second frame rate, occurrence of a gap between a plurality of streams at the stage of timing correction can be prevented and synchronous display of the plurality of video streams at the third frame rate can be guaranteed by controlling the timing correction processing on the basis of the identification information indicating the synchronization relationship as described above. Further, the identification information indicating a synchronization relationship is caused to include identification information indicating whether being advanced or delayed from the first frame rate when not being in synchronization with the first frame rate, whereby a correction direction of the display start timing can be easily determined.

Effects of the Invention

According to the present technology, for example, 120 Hz display can be favorably performed on the reception side even in the case of encoding and transmitting moving image data of 24 Hz at the frame rate of 60 Hz. Note that the effects described here are not necessarily limited, and any of effects described in the present disclosure may be exhibited.

BRIEF DESCRIPTION OF DRAWINGS

FIG. 8 is a diagram illustrating a structure example of a picture timing SEI message.

FIG. 9 is a diagram illustrating a display sequence of "pic_struct" of the picture timing SEI message.

FIG. 10 is a diagram illustrating an access unit of a head of a GOP in the case where an encoding method is HEVC.

FIG. 12 is a diagram illustrating a structure example of a picture timing displacement SEI message and content of principal information in the structure example.

FIG. 16 is a diagram illustrating an example of a relationship among a frame rate of original material, a display frame rate, an encoding frame rate, the number of display repeats, and the number of shift pictures.

FIG. 17 is a diagram illustrating a structure example of the picture timing displacement SEI message in the case of inserting only identification information "PS" and content of principal information in the structure example.

MODE FOR CARRYING OUT THE INVENTION

Hereinafter, modes for implementing the invention (hereinafter embodiments) will be described. Note that the description will be given in the following order.
1. Embodiment
2. Modification 1. Embodiment

Figure 1:
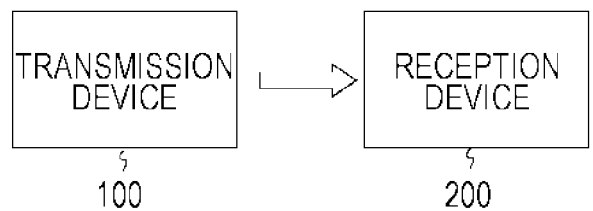
FIG. 1 is a block diagram illustrating a configuration example of a transmission/reception system as an embodiment.

[Transmission/Reception System]
FIG. 1 illustrates a configuration example of a transmission/reception system 10 as an embodiment. The transmission/reception system 10 has a configuration including a transmission device 100 and a reception device 200.

The transmission device 100 transmits a video stream VS (hereinafter simply referred to as "video stream VS") transmitted by a container on a broadcast wave or net packet. In this video stream VS, a video stream of 60 Hz (60p stream) obtained by encoding each picture constituting moving image data of a frame rate of 24 Hz (first frame rate) at a frame rate of 60 Hz (second frame rate) is included. In this case, for example, encoding such as H.264/AVC or H.265/HEVC is applied.

FIG. 2(a) illustrates an example of encoding. In the illustrated example, hierarchical encoding is performed in three layers, but the hierarchical encoding may be in one layer. The horizontal axis represents a picture order of composition (POC). Each of the solid rectangular frames indicates each picture constituting moving image data of 24 Hz, and only encoded image data of these pictures are included in the video stream of 60 Hz. In the solid rectangular frame, the number without parentheses indicates a display order, and the number with the parentheses indicates an order of encoded pictures, that is, an encoding order (a decoding order on a reception side).

Further, in the illustrated example, a B picture (the display order "0" and the encoding order "1") exists before an I picture (the display order "6" and the encoding order "0") by reference to the I picture. Further, a P picture (the display order "16" and the encoding order "2") exists after the I picture (the display order "6" and the encoding order "0") by reference to the I picture. Further, a B picture (the display order "10" and the encoding order "3") exists between the I picture (the display order "6" and the encoding order "0") and the P picture (the display order "16" and the encoding order "2") by reference to the I picture and the P picture.

A picture timing SEI message (Picture_timing SEI message) is inserted in the encoded image data of each picture illustrated by the solid rectangular frame, and the number of repeats is specified in a field of "pic_struct". In this case, the number of repeats is specified to 3 in the B picture (the display order "0" and the encoding order "1") and the B picture (the display order "10" and the encoding order "3"), and the number of repeats is specified to 2 in the I picture (the display order "6" and the encoding order "0") and the P picture (the display order "16" and the encoding order "2"). With the specification, display at the frame rate of 60 Hz (60 Hz display) by 3-2 pulldown can be performed on the reception side.

FIG. 2(b) illustrates another example of encoding. In the illustrated example, hierarchical encoding is performed in three layers, but the hierarchical encoding may be in one layer. The horizontal axis represents a picture order of composition (POC). Each of the solid rectangular frames indicates each picture constituting moving image data of 24 Hz, and only encoded image data of these pictures are included in the video stream of 60 Hz. In the solid rectangular frame, the number without parentheses indicates a display order, and the number with the parentheses indicates an order of encoded pictures, that is, an encoding order (a decoding order on a reception side).

Further, in the illustrated example, the B picture (the display order "0" and the encoding order "1") exists before an I picture (the display order "4" and the encoding order "0") by reference to the I picture. Further, a P picture (the display order "14" and the encoding order "2") exists after the I picture (the display order "4" and the encoding order "0") by reference to the I picture. Further, the B picture (the display order "10" and the encoding order "3") exists between the I picture (the display order "4" and the encoding order "0") and the P picture (the display order "14" and the encoding order "2") by reference to the I picture and the P picture.

A picture timing SEI message (Picture_timing SEI message) is inserted in the encoded image data of each picture illustrated by the solid rectangular frame, and the number of repeats is specified in a field of "pic_struct". In this case, the number of repeats is specified to 2 in the B picture (the display order "0" and the encoding order "1") and the B picture (the display order "10" and the encoding order "3"), and the number of repeats is specified to 3 in an I picture (the display order "4" and the encoding order "0") and a P picture (the display order "14" and the encoding order "2"). With the specification, display at the frame rate of 60 Hz (60 Hz display) by 3-2 pulldown can be performed on the reception side.

Identification information indicating a synchronization relationship between the frame rate of 24 Hz and display start timing is inserted into the encoded image data of each picture included in a video stream of the frame rate of 60 Hz.

For example, in the encoding example in FIG. 2(a), the picture display start timing of the B picture (the display order "0" and the encoding order "1") and the B picture (the display order "10" and the encoding order "3") coincides with the 24 Hz timing. Therefore, identification information "PS" indicating that the display start timing coincides with the 24 Hz timing is inserted into these pictures.

Further, in the encoding example in FIG. 2(a), the picture display start timing of the I picture (the display order "6" and the encoding order "0") and the P picture (the display order "16" and the encoding order "2") is delayed from the 24 Hz timing. Therefore, identification information "PA" indicating that the display start timing is delayed from the 24 Hz timing is inserted into these pictures.

For example, in the encoding example in FIG. 2(b), the picture display start timing of the B picture (the display order "0" and the encoding order "1") and the B picture (the display order "10" and the encoding order "3") coincides with the 24 Hz timing. Therefore, identification information "PS" indicating that the display start timing coincides with the 24 Hz timing is inserted into these pictures.

Further, in the encoding example in FIG. 2(b), the picture display start timing of the I picture (the display order "4" and the encoding order "0") and the P picture (the display order "14" and the encoding order "2") is advanced from the 24 Hz timing. Therefore, identification information "PB" indicating that the display start timing is advanced from the 24 Hz timing is inserted into these pictures.

The reception device 200 receives the video stream VS on a broadcast wave or a net packet sent from the transmission device 100. In this video stream VS, the video stream of 60 Hz (60p stream) obtained by encoding each picture constituting the moving image data of 24 Hz at 60 Hz is included (see FIGS. 2(a) and 2(b)) The identification information ("PS", "PA", "PB") indicating the synchronization relationship between the frame rate of 24 Hz and the display start timing is inserted in the encoded image data of the pictures included in the video stream of the frame rate of 60 Hz.

In the case of performing the display (60 Hz display) at the frame rate of 60 Hz, the reception device 200 performs display repeat processing by the number of repeats specified in the field of "pic_struct" of the picture timing SEI message (Picture_timing SEI message), and performs display at the frame rate of 60 Hz (60 Hz display).

Meanwhile, in the case of performing display (120 Hz display) at the frame rate of 120 Hz, the reception device 200 corrects the display start timing of the image data of each picture to the same state as in a case of encoding each picture constituting the moving image data of 24 Hz at the frame rate of 120 Hz on the basis of the identification information, performs the display repeat processing for the image data of each picture with the corrected display start timing at the frame rate of 120 Hz by the number of repeats of five times, and performs the display at the frame rate of 120 Hz (120 Hz).

Figure 2:
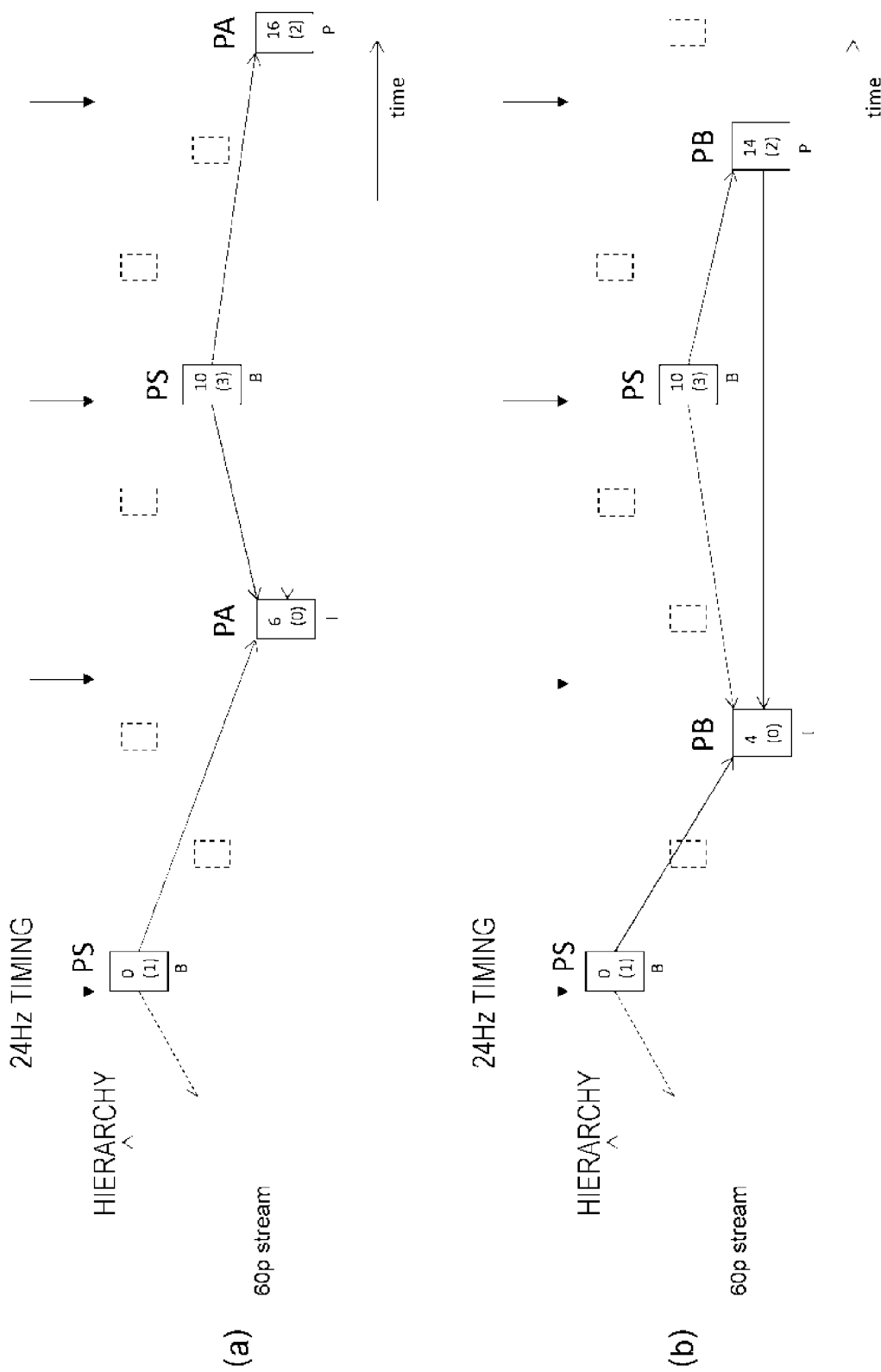
FIG. 2 is a diagram illustrating an encoding example of a case of encoding each picture constituting moving image data of a frame rate of 24 Hz at a frame rate of 60 Hz.
Figure 3:
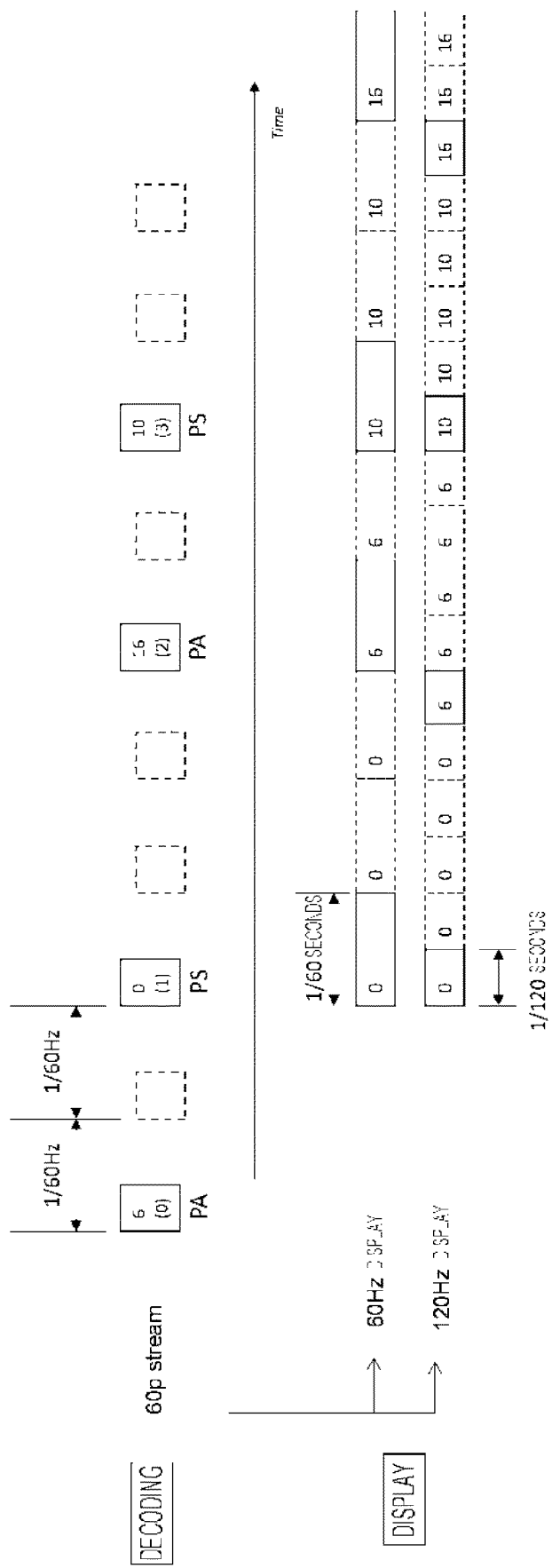
FIG. 3 is a diagram illustrating an example of decoding timing and display start timing of each picture in a video stream obtained by encoding the each picture constituting moving image data of a frame rate of 24 Hz at the frame rate of 60 Hz.

FIG. 3 illustrates decoding timing and the display start timing of each picture, corresponding to the encoding example in FIG. 2(a). In this case, the pictures are decoded in order of the I picture (the display order "6" and the encoding order "0")→the B picture (the display order "0" and the encoding order "1")→the P picture (the display order "16" and the encoding order "2")→the B picture (the display order "10" and the encoding order "3"). Then, after the decoding of the B picture (the display order "0" and the encoding order "1"), the pictures are displayed in order of the B picture (the display order "0" and the encoding order "1")→the I picture (the display order "6" and the encoding order "0")→the B picture (the display order "10" and the encoding order "3")→the P picture (the display order "16" and the encoding order "2").

In the case of 60 Hz display, three times of display repeats are performed at the frame rate of 60 Hz for the B picture (the display order "0"), twice of display repeats are performed at the frame rate of 60 Hz for the I picture (the display order "6"), three times of display repeats are performed at the frame rate of 60 Hz for the B picture (the display order "10"), and twice of display repeats are performed at the frame rate of 60 Hz for the P picture (the display order "16") while the display start timing of the pictures remains unchanged.

In the case of 120 Hz display, five times of display repeats are performed at the frame rate of 120 Hz for the B picture (the display order "0") while the display start timing is unchanged, five times of display repeats are performed at the frame rate of 120 Hz for the I picture (the display order "6") while the display start timing is corrected to be advanced by $1/120$ seconds, five times of display repeats are performed at the frame rate of 120 Hz for the B picture (the display order "10") while the display start timing is unchanged, and five times of display repeats are performed at the frame rate of 120 Hz for the P picture (the display order "16") while the display start timing is corrected to be advanced by $1/120$ seconds.

Figure 4:
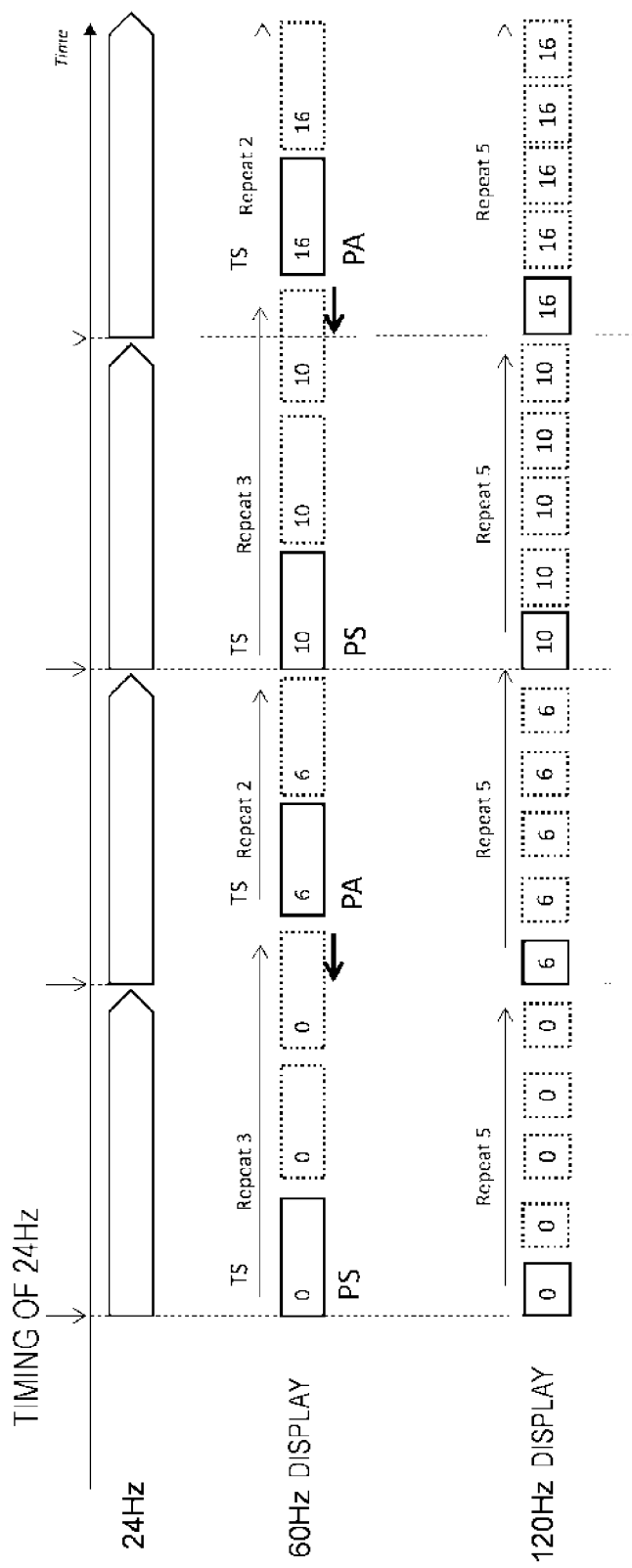
FIG. 4 is a diagram illustrating an example of correspondence between timing of 24 Hz and the display start timing of each picture in 60 Hz display and 120 Hz display.

FIG. 4 illustrates an example of correspondence between timing of 24 Hz and the display start timing of each picture in 60 Hz display and 120 Hz display. "TS" indicates a time stamp providing the display start timing added to the encoded image data of each picture and transmitted. In the case of 60 Hz display, the display start timing is delayed from the timing of 24 Hz in every two pictures. In contrast, in the case of 120 Hz display, the display start timing is corrected, and the display start timing of all the pictures coincide with the timing of 24 Hz. Therefore, in the case of 120 Hz display, smooth display is performed even in a moving scene.

Figure 5:
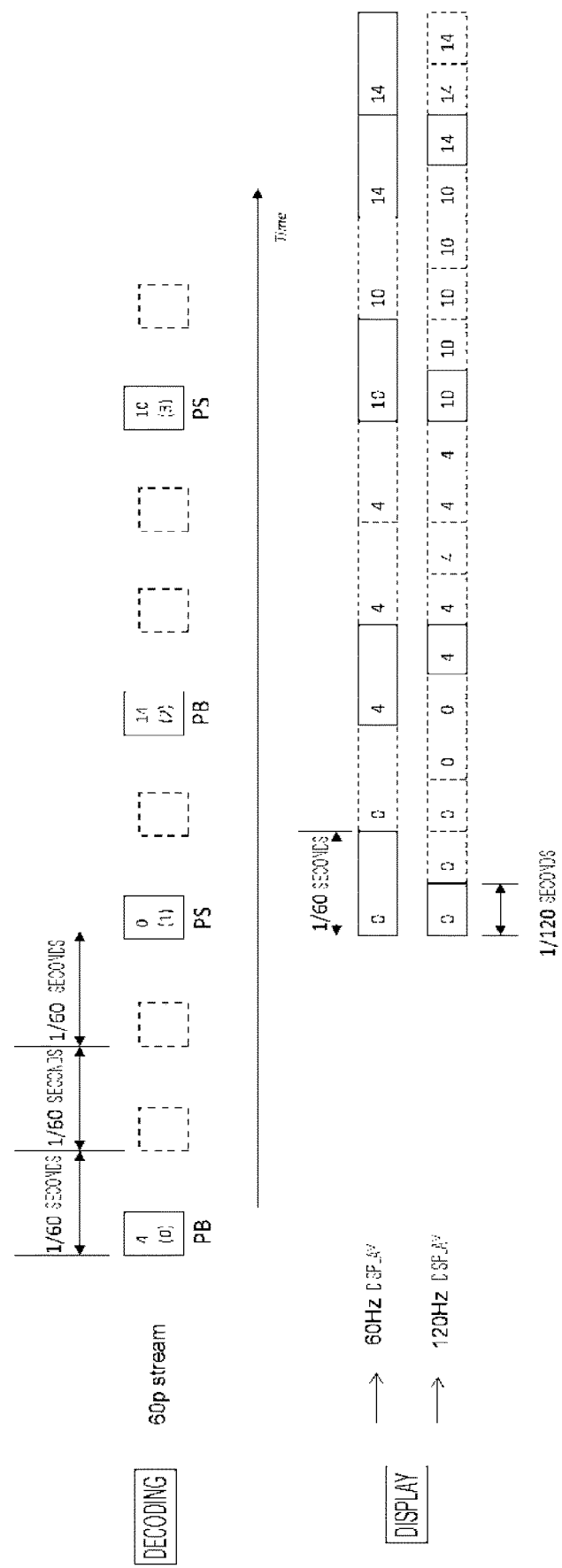
FIG. 5 is a diagram illustrating an example of the decoding timing and the display start timing of each picture in a video stream obtained by encoding the each picture constituting moving image data of a frame rate of 24 Hz at the frame rate of 60 Hz.

FIG. 5 illustrates decoding timing and the display start timing of each picture, corresponding to the encoding example in FIG. 2(b). In this case, the pictures are decoded in order of the I picture (the display order "4" and the encoding order "0")→the B picture (the display order "0" and the encoding order "1")→the P picture (the display order "14" and the encoding order "2")→the B picture (the display order "10" and the encoding order "3"). Then, after the decoding of the B picture (the display order "0" and the encoding order "1"), the pictures are displayed in order of the B picture (the display order "0" and the encoding order "1")→the I picture (the display order "4" and the encoding order "0")→the B picture (the display order "10" and the encoding order "3")→the P picture (the display order "14" and the encoding order "2").

In the case of 60 Hz display, twice of display repeats are performed at the frame rate of 60 Hz for the B picture (the display order "0"), three times of display repeats are performed at the frame rate of 60 Hz for the I picture (the display order "4"), twice of display repeats are performed at the frame rate of 60 Hz for the B picture (the display order "10"), and three times of display repeats are performed at the frame rate of 60 Hz for the P picture (the display order ("14") while the display start timing of the pictures remains unchanged.

In the case of 120 Hz display, five times of display repeats is performed at the frame rate of 120 Hz for the B picture (the display order "0") while the display start timing is unchanged, five times of display repeats are performed at the frame rate of 120 Hz for the I picture (the display order "4") while the display start timing is corrected to be delayed by $1/120$ seconds, five times of display repeats are performed at the frame rate of 120 Hz for the B picture (the display order "10") while the display start timing is unchanged, and five times of display repeats are performed at the frame rate of 120 Hz for the P picture (the display order "16") while the display start timing is corrected to be delayed by $1/120$ seconds.

Figure 6:
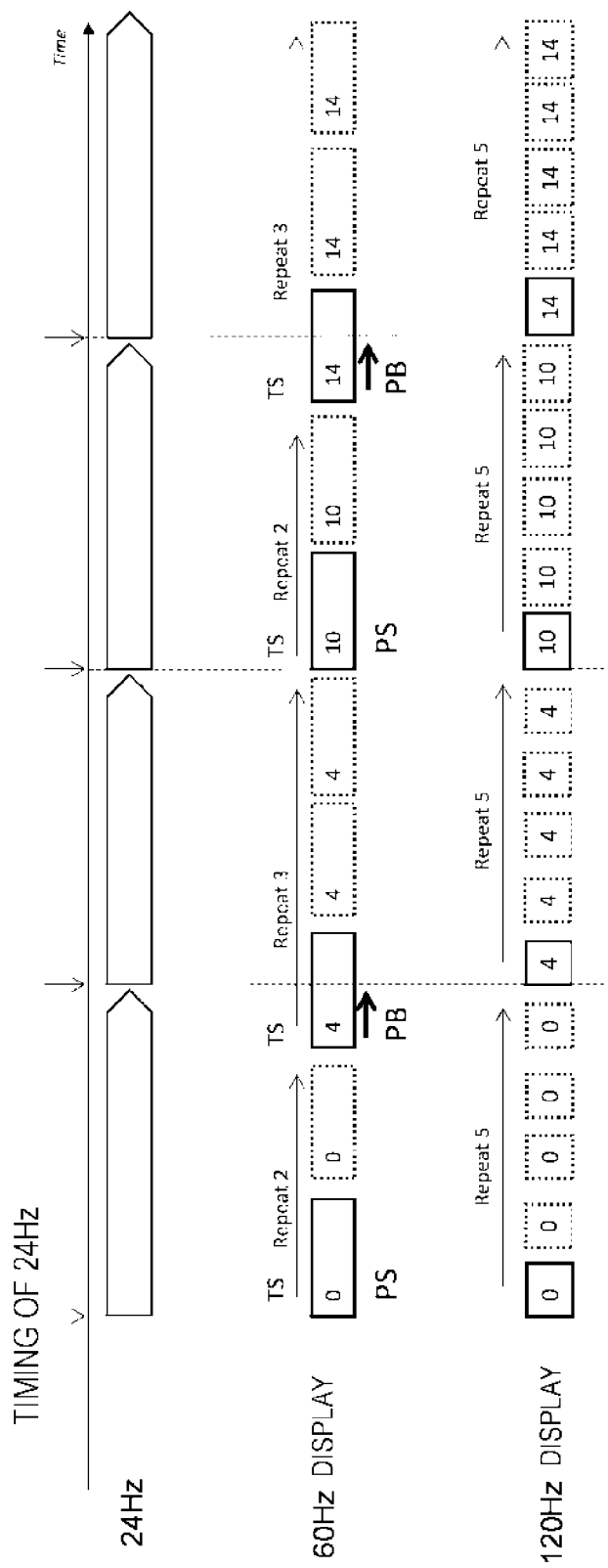
FIG. 6 is a diagram illustrating an example of the correspondence between timing of 24 Hz and the display start timing of each picture in 60 Hz display and 120 Hz display.

FIG. 6 illustrates an example of correspondence between timing of 24 Hz and the display start timing of each picture in 60 Hz display and 120 Hz display. "TS" indicates a time stamp providing the display start timing added to the encoded image data of each picture and transmitted. In the case of 60 Hz display, the display start timing is advanced from the timing of 24 Hz in every two pictures. In contrast, in the case of 120 Hz display, the display start timing is corrected, and the display start timing of all the pictures coincide with the timing of 24 Hz. Therefore, in the case of 120 Hz display, smooth display is performed even in a moving scene.

"Configuration of Transmission Device"

Figure 7:
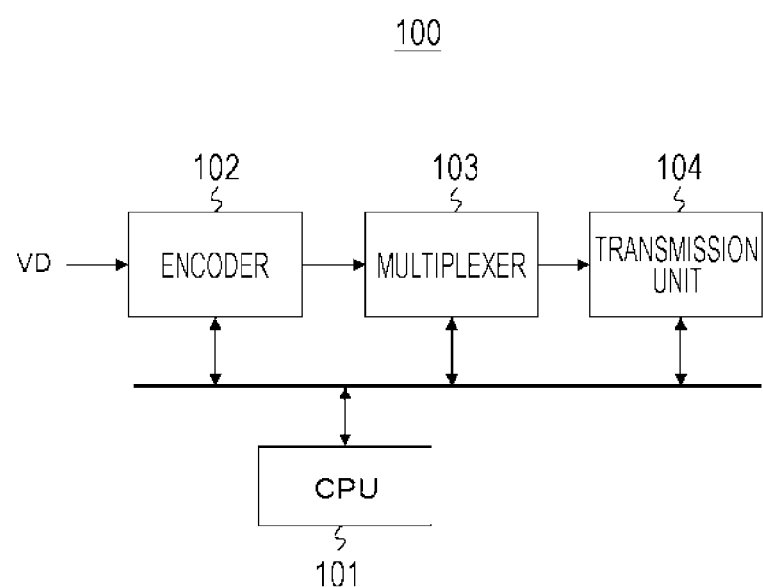
FIG. 7 is a block diagram illustrating a configuration example of a transmission device.

FIG. 7 illustrates a configuration example of the transmission device 100. The transmission device 100 includes a central processing unit (CPU) 101, an encoder 102, a multiplexer 103, and a transmission unit 104. The CPU 101 is a control unit, and controls the operation of each unit of the transmission device 100.

The encoder 102 uses moving image data VD of the frame rate of 24 Hz as an input, and encodes each picture constituting the moving image data VD at the frame rate of 60 Hz (see the encoding examples in FIGS. 2(*a*) and 2(*b*)) to obtain the video stream of the frame rate of 60 Hz. In this case, for example, encoding such as H.264/AVC or H.265/HEVC is applied.

The encoder 102 inserts the picture timing SEI message (Picture timing SEI message) into the encoded image data of each picture actually included in the video stream of the frame rate of 60 Hz, and specifies the number of repeats in the field of "pic_struct". With the specification, the display at the frame rate of 60 Hz (60 Hz display) by 3-2 pulldown can be performed on the reception side. FIG. 8 illustrates a structure example (Syntax) of the picture timing SEI message. FIG. 9 illustrates a display sequence of "pic_struct".

In the encoding examples in FIGS. 2(*a*) and 2(*b*), the solid rectangular frame indicates the encoded image data of each picture actually included in the frame rate of 60 Hz. In the case of the encoding example in FIG. 2(*a*), the number of repeats is specified to 3 in the B picture (the display order "0" and the encoding order "1") and the B picture (the display order "10" and the encoding order "3"), and the number of repeats is specified to 2 in the I picture (the display order "6" and the encoding order "0") and the P picture (the display order "16" and the encoding order "2"). Further, in the case of the encoding example in FIG. 2(*b*), the number of repeats is specified to 2 in the B picture (the display order "0" and the encoding order "1") and the B picture (the display order "10" and the encoding order "3"), and the number of repeats is specified to 3 in the I picture (the display order "4" and the encoding order "0") and the P picture (the display order "14" and the encoding order "2").

Further, the encoder 102 inserts the identification information indicating the synchronization relationship between the frame rate of 24 Hz and the display start timing, that is, phase information into the encoded image data of each picture actually included in the video stream of the frame rate of 60 Hz. Note that the display start timing of each picture is provided by a time stamp (TS) for display added to the encoded image data of each picture.

In this case, any of the identification information "PS" indicating that the display start timing coincides with the 24 Hz timing, the identification information "PA" indicating that the display start timing is delayed from the 24 Hz timing, and the identification information "PB" indicating that the display start timing is advanced from the 24 Hz timing is inserted into the encoded image data of each picture.

In the case of the encoding example in FIG. 2(*a*), the identification information "PS" is inserted into the B picture (the display order "0" and the encoding order "1") and the B picture (the display order "10" and the encoding order "3"), and the identification information "PA" is inserted into the I picture (the display order "6" and the encoding order "0") and the P picture (the display order "16" and the encoding order "2"). Further, in the case of the encoding example in FIG. 2(*b*), the identification information "PS" is inserted into the B picture (the display order "0" and the encoding order "1") and the B picture (the display order "10" and the encoding order "3"), and the identification information "PB" is inserted into the I picture (the display order "4" and the encoding order "0") and the P picture (the display order "14" and the encoding order "2").

The encoder 102 inserts the picture timing displacement SEI message (Picture_timing_displacement SEI message) to be newly defined into an "SEIs" portion of an access unit (AU) in order to insert these pieces of identification information into the encoded image data of each picture.

Figure 11:
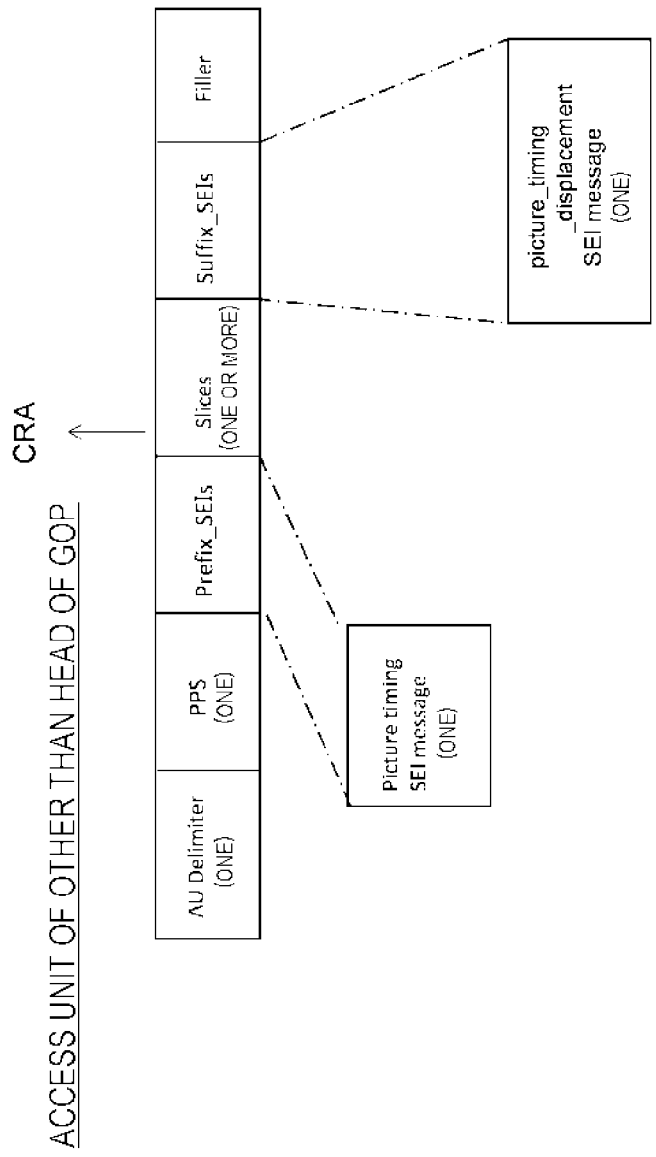
FIG. 11 is a diagram illustrating an access unit of other than the head of a GOP in the case where an encoding method is HEVC.

FIG. 10 illustrates an access unit of a head of a GOP (Group Of Pictures) in the case where the encoding method is HEVC. Further, FIG. 11 illustrates an access unit of other than the head of the GOP in the case where the encoding method is HEVC. In the case of the HEVC encoding system, a group of SEI messages "Prefix_SEIs" for decoding is arranged before slices in which pixel data is encoded, and a group of SEI messages "Suffix_SEIs" for display is arranged after the slices. As illustrated in FIGS. 10 and 11, the picture timing displacement SEI message is arranged as the group of SEI messages "Suffix_SEIs", for example.

FIG. 12(*a*) illustrates a structure example (Syntax) of the picture timing displacement SEI message. FIG. 12(*b*) illustrates content (Semantics) of principal information in the structure example. A 1-bit field of "resync_to_picstruct_flag" indicates whether a starting point of the repeat indicated by "pic_struct" is the same as the timing of the original 24 Hz material. For example, "1" indicates the same and "0" indicates not the same. "Resync_to_picstruct_flag"="1" constitutes the identification information "PS" indicating that the display start timing coincides with the 24 Hz timing.

A 1-bit field of "early display flag" indicates whether the display start timing is delayed from the 24 Hz timing. In the case where this value is "1", synchronization display with 24 Hz is possible if readout is performed earlier than the number of frame repeats indicated by one previous "pic_struct", that is, the identification information "PA" is indicated, and a value "0" does not indicate the above.

A 1-bit field of "late display flag" indicates whether the display start timing is advanced from the 24 Hz timing. In the case where this value is "1", synchronization display with 24 Hz is possible if readout is performed later than the number of frame repeats indicated by the one previous "pic_struct", that is, the identification information "PB" is indicated, and a value "0" does not indicate the above.

Figure 13:
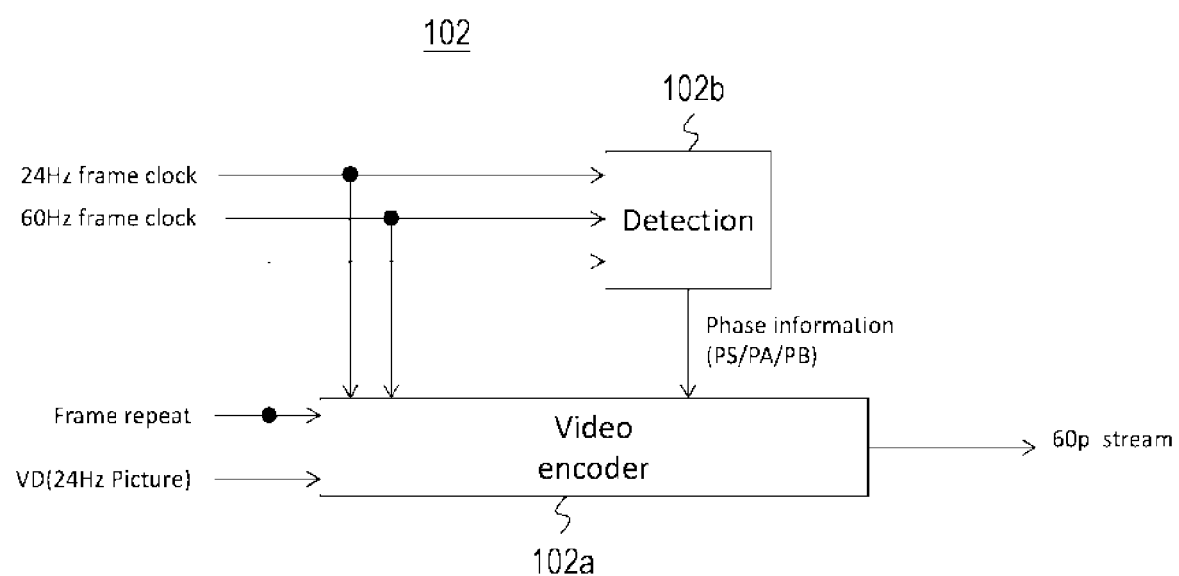
FIG. 13 is a block diagram illustrating a configuration example of an encoder.

FIG. 13 illustrates a configuration example of the encoder 102. The encoder 102 has a video encoder 102*a* and a detection unit 102*b*. The moving image data VD of the frame rate of 24 Hz is input to the video encoder 102*a*. Further, frame repeat (Frame repeat) information indicating the number of repeats for 3-2 pulldown processing is supplied to the video encoder 102*a* and the detection unit 102*b*, corresponding to each picture of the moving image data VD.

Further, 24 Hz frame clock frame-synchronized with the moving image data VD is supplied to the video encoder 102a and the detection unit 102b. Further, 60 Hz frame clock synchronized with every other 24 Hz frame clock is supplied to the video encoder 102a and the detection unit 102b.

In the video encoder 102a, each picture constituting the moving image data VD is encoded at the frame rate of 60 Hz on the basis of the 60 Hz frame clock (see the encoding examples in FIGS. 2(a) and 2(b)), and the video stream of the frame rate of 60 Hz (60p stream) is obtained. Further, in the video encoder 102a, the number of repeats is specified in the field of "pic_struct" of the picture timing SEI message to be inserted into the encoded image data of each picture actually included in the video stream of the frame rate of 60 Hz on the basis of the frame repeat (Frame repeat) information corresponding to each picture constituting the moving image data VD.

Further, in the detection unit 102b, identification information (PS/PA/PB) indicating a synchronization relationship between the display start timing of each picture actually included in the video stream of the frame rate of 60 Hz and the frame rate of 24 Hz is generated on the basis of the phase relationship between the 24 Hz frame clock and the 60 Hz frame clock, and is supplied to the video encoder 102a. Then, the picture timing displacement SEI message (see FIG. 12(a)) having the identification information corresponding to each picture is inserted into the encoded image data of each picture actually included in the video stream of the frame rate of 60 Hz.

Referring back to FIG. 7, the multiplexer 103 converts the video stream generated in the encoder 102 into a packetized elementary stream (PES), and further converts the stream into a transport packet and multiplexes the packet to obtain the video stream VS as a multiplexed stream. The transmission unit 104 transmits the video stream VS, which is obtained in the multiplexer 103, on a broadcast wave or a net packet to the reception device 200.

Figure 14:
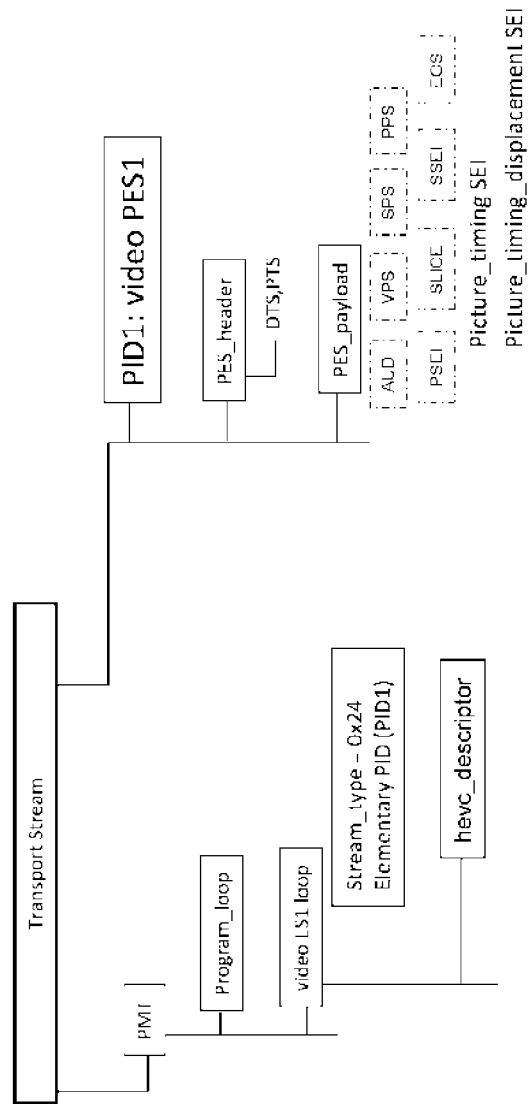
FIG. 14 is a diagram illustrating a configuration example of a video stream.

FIG. 14 illustrates a configuration example of the video stream VS. In this configuration example, a PES packet "video PES 1" identified by PID 1, of the video stream, exists. In a PES header, DTS and PTS are arranged. The encoded image data of each picture included in a PES payload is configured by NAL units such as "AUD", "VPS", "SPS", "PPS", "PSEI", "SLICE", "SSEI", and "EOS". As the SEI messages, the above-described picture timing SEI message, the picture timing displacement SEI message, and the like are inserted.

Further, the video stream VS includes a program map table (PMT) as program specific information (PSI). This PSI is information that describes which program each elementary stream belongs to. In the PMT, a program loop (Program loop) that describes information related to the entire program exists. Further, in the PMT, an elementary stream loop having information related to each elementary stream exists. In this configuration example, a video elementary stream loop (video ES 1 loop) exists.

In the video elementary stream loop, information such as a stream type and a packet identifier (PID) is arranged corresponding to the video stream (video PES 1), and a descriptor that describes information related to the video stream is also arranged.

The operation of the transmission device 100 illustrated in FIG. 7 will be briefly described. The moving image data VD of the frame rate of 24 Hz is input to the encoder 102. In the encoder 102, encoding such as H.264/AVC or H.265/HEVC is applied to each picture constituting the moving image data VD at the frame rate of 60 Hz (see the encoding examples in FIGS. 2(a) and 2(b)), and the video stream of the frame rate of 60 Hz is obtained.

Further, in the encoder 102, the picture timing SEI message is inserted into the encoded image data of each picture actually included in the video stream of the frame rate of 60 Hz, and the number of repeats for the 3-2 pulldown processing on the reception side is specified in the field of "pic_struct".

Further, in the encoder 102, the picture timing displacement SEI message (see FIG. 12(a)) having the identification information (PS/PA/PB) indicating the synchronization relationship between the frame rate of 24 Hz and the display start timing is inserted into the encoded image data of each picture actually included in the video stream of the frame rate of 60 Hz.

The video stream generated by the encoder 102 is supplied to the multiplexer 103. In the multiplexer 103, the video stream is converted into a PES packet and into a transport packet, and is multiplexed, and the video stream VS as a container (multiplexed stream) is obtained. The video stream VS is sent to the transmission unit 104. In the transmission unit 104, the video stream VS on a broadcast wave or net packet is transmitted.

"Configuration of Reception Device"

Figure 15:
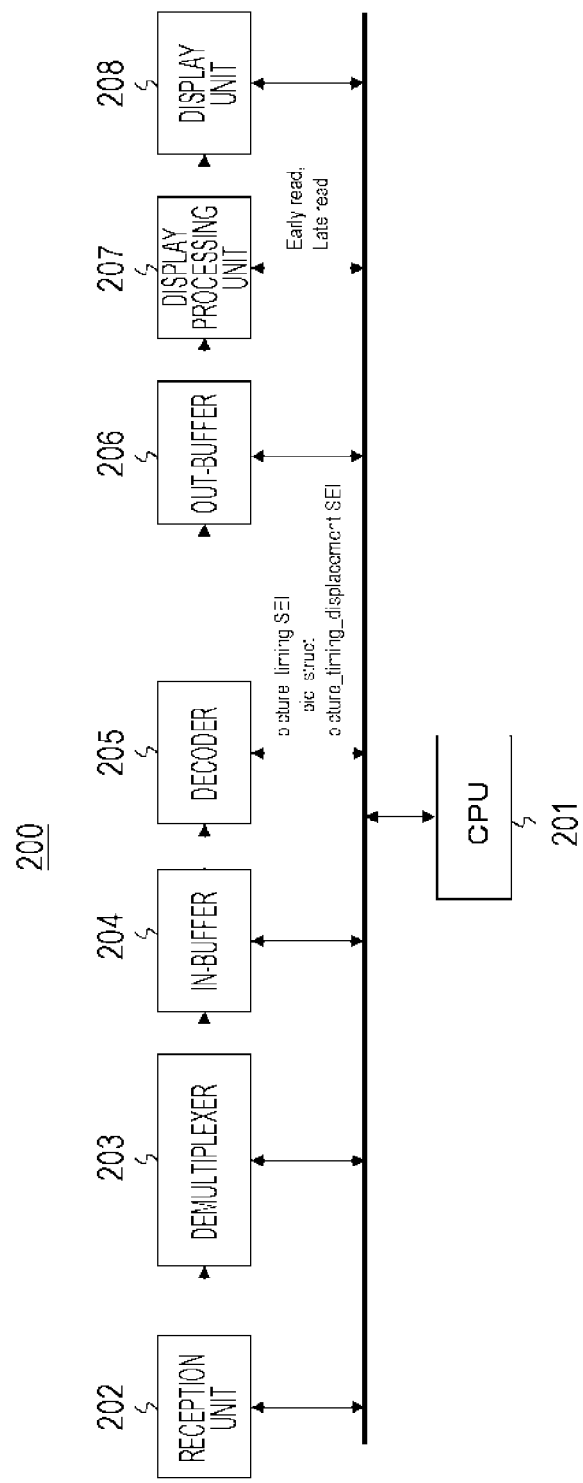
FIG. 15 is a block diagram illustrating a configuration example of a reception device.

FIG. 15 illustrates a configuration example of the reception device 200. The reception device 200 includes a central processing unit (CPU) 201, a reception unit 202, a demultiplexer 203, an in-buffer 204, a decoder 205, an out-buffer 206, a display processing unit 207, and a display unit 208. The CPU 201 constitutes a control unit and controls the operation of each unit of the reception device 200.

The reception unit 202 receives the video stream VS on a broadcast wave or a net packet sent from the transmission device 100. In this video stream VS, the video stream of 60 Hz (60p stream) obtained by encoding each picture constituting the moving image data of the frame rate of 24 Hz at the frame rate of 60 Hz is included.

The demultiplexer 203 takes out the video stream from the video stream VS by PID filtering. Further, the demultiplexer 203 extracts section information included in a layer of the video stream VS and sends the section information to the CPU 201. The in-buffer 204 temporarily stores the video stream taken out by the demultiplexer 203.

The decoder 205 applies decoding processing to the video stream stored in the in-buffer 204 to obtain image data of each picture constituting the moving image data of the frame rate of 24 Hz actually included in the video stream. The out-buffer 206 temporarily stores the image data of each picture obtained by the decoder 205.

Further, the decoder 205 extracts the PTS indicating the display start timing of each picture, furthermore, a parameter set and the SEI message inserted in the encoded image data (access unit) of each picture, and sends the extracted information to the CPU 201. In this case, the picture timing SEI message (see FIG. 8) having the number of repeats information for performing the 3-2 pulldown processing, the picture timing displacement SEI message (see FIG. 12(a)) having the identification information (PS/PA/PB) indicating the synchronization relationship between the display start timing of each picture and the frame rate of 24 Hz, and the like are also extracted.

In the case of performing display at the frame rate of 60 Hz (60 Hz display), the CPU 201 uses the display start timing indicated by the PTS as it is as the display start timing of each picture stored in the out-buffer 206. In this case, the display processing unit 207 starts readout of the image data of respective pictures from the out-buffer 206 at the display start timing indicated by the PTS, performs the display repeat processing at the frame rate of 60 Hz by the number of repeats specified in the field of "pic_struct" of the picture timing SEI message, and obtains the moving image data of the frame rate of 60 Hz by the 3-2 pulldown processing, under the control of the CPU 201 (see the "60 Hz display" portion in FIGS. 4 and 6).

Meanwhile, in the case of performing display at the frame rate (third frame rate) of 120 Hz (120 Hz display), the CPU 201 appropriately corrects the display start timing indicated by the PTS on the basis of the identification information (PS/PA/PB) inserted in the encoded image data of each picture, instead of using the display start timing indicated by the PTS as it is as the display start timing of each picture stored in the out-buffer 206.

In this case, the CPU 201 uses the display start timing indicated by the PTS as it is as the display start timing of the picture in which the identification information "PS" is inserted. Further, as for the display start timing of the picture in which the identification information "PA" is inserted, the CPU 201 shifts and corrects for use the display start timing indicated by PTS in a direction into which the display start timing is advanced by one picture, that is, $1/120$ seconds, at the frame rate of 120 Hz. Further, as for the display start timing of the picture in which the identification information "PB" is inserted, the CPU 201 shifts and corrects for use the display start timing indicated by PTS in a direction into which the display start timing is delayed by one picture, that is, $1/120$ seconds, at the frame rate of 120 Hz.

In this case, the display processing unit 207 starts readout of the image data of respective pictures from the out-buffer 206 at the corrected display start timing, performs the display repeat processing at the frame rate of 120 Hz by five times, and obtains the moving image data of the frame rate of 120 Hz, under the control of the CPU 201 (see the "120 Hz display" portion in FIGS. 4 and 6).

Here, the number of display repeats "Frame Repeat At Display Rate" can be calculated by the following expression (1) from a display frame rate "Display Frame Rate (Hz)" that is the third frame rate and a frame rate of the original material "Original Frame Rate (Hz)" that is the first frame rate.

{Frame Repeat at Display Rate}={Display Frame Rate}/{Original Frame Rate}   (1)

Further, the number of shift pictures "Num of pictures to Shift Timing" can be calculated by the following expression (2) from the display frame rate "Display Frame Rate (Hz)" that is the third frame rate and an encoding frame rate "Encoding Frame Rate (Hz)" that is the second frame rate.

{Num of pictures to Shift Timing}={Display Frame Rate}/{Encoding Frame Rate*2}   (2)

FIG. 16 illustrates an example of correspondence among the frame rate of the original material "Original Frame Rate (Hz)", the display frame rate "Display Frame Rate (Hz)", the encoding frame rate "Encoding Frame Rate (Hz)", the number of display repeats "Frame Repeat At Display Rate", and the number of shift pictures "Num of pictures to Shift Timing".

In the present embodiment, when the "Original Frame Rate (Hz)" is 24 Hz, the "Display Frame Rate (Hz)" is 120 Hz, and the "Encoding Frame Rate (Hz)" is 60 Hz, the "Frame Repeat At Display Rate" is 5, and the "Num of pictures to Shift Timing" is 1. Further, as another example, when the "Original Frame Rate (Hz)" is 24 Hz, the "Display Frame Rate (Hz)" is 240 Hz, and the "Encoding Frame Rate (Hz)" is 60 Hz, the "Frame Repeat At Display Rate" is 10 and the "Num of pictures to Shift Timing" is 2. Further, as another example, when the "Original Frame Rate (Hz)" is 48 Hz, the "Display Frame Rate (Hz)" is 240 Hz, and the "Encoding Frame Rate (Hz)" is 120 Hz, the "Frame Repeat At Display Rate" is 5 and the "Num of pictures to Shift Timing" is 1. Note that the illustrated example is an example and the embodiment is not limited to the example.

Here, an influence on the out-buffer 206 in the case where the display start timing of an asynchronous picture (a picture in which the identification information "PA" or "PB" is inserted) is shifted and corrected, and read early or late in the display processing unit 207 will be considered.

First, the decoding timing is drawing timing of a picture from the in-buffer 204, and does not affect the out-buffer 206. Next, the buffer size (buffer occupancy) of the out-buffer 206 after decoding is different from what the transmission-side encoder intends, as the asynchronous picture is read early or late.

In the case of changing the timing of the out-buffer 206 on the reception side, there is a concern as to whether a referenced picture of a succeeding decoding picture will fail. However, reading the asynchronous picture early or late means advancing or delaying the timing to start readout from the out-buffer 206, and does not affect the time to stay in the out-buffer 206 as a non-reference picture. In addition, the readout gap is equivalent to one picture with the accuracy of 120 Hz. Further, the gap is synchronously refreshed with 24 Hz at two picture intervals without spreading. Therefore, there is no problem about buffer management of the out-buffer 206.

Referring back to FIG. 15, the display unit 208 displays a moving image based on the moving image data obtained by the display processing unit 207. The display unit 208 is configured by, for example, a liquid crystal display (LCD), an organic electro-luminescence (EL) panel, or the like. Note that the display unit 208 may be an external device connected to the reception device 200.

The operation of the reception device 200 illustrated in FIG. 15 will be briefly described. In the reception unit 202, the video stream VS on a broadcast wave or a net packet sent from the transmission device 100 is received. In this video stream VS, the video stream of 60 Hz (60p stream) obtained by encoding each picture constituting the moving image data of the frame rate of 24 Hz at the frame rate of 60 Hz is included.

The video stream VS received by the reception unit 202 is supplied to the demultiplexer 203. In the demultiplexer 203, a video stream is taken out from the video stream VS by PID filtering. Further, in the demultiplexer 203, the section information included in a layer of the video stream VS is extracted and sent to the CPU 201.

The video stream taken out by the demultiplexer 203 is supplied to the in-buffer 204 and is temporarily stored therein. This video stream includes the encoded image data of each picture constituting the moving image data of the frame rate of 24 Hz. The encoded image data of each picture stored in the in-buffer 204 is taken in to the decoder 205 at the timing indicated by a decoding time stamp (DTS) and decoded. Then, the image data of each picture obtained by the decoder 205 is supplied to the out-buffer 206 and is temporarily stored.

Further, in the decoder 205, the PTS indicating the display start timing of each picture, and furthermore, the parameter set and the SEI message inserted in the encoded image data (access unit) of each picture are extracted and sent to the CPU 201. In this case, the picture timing SEI message having the number of repeats information for performing the 3-2 pulldown processing, the picture timing displacement SEI message having the identification information (PS/PA/PB) indicating the synchronization relationship between the display start timing of each picture and the frame rate of 24 Hz, and the like are also extracted.

Hereinafter, the operation in the case where the reception device 200 performs display at the frame rate of 60 Hz (60 Hz display) and the operation in the case where the reception device 200 performs display at the frame rate of 120 Hz (120 Hz display) will be separately described.

First, the case where the reception device 200 performs display at the frame rate of 60 Hz (60 Hz display) will be described. In this case, in the CPU 201, the display start timing indicated by the PTS is used as it is as the display start timing of each picture stored in the out-buffer 206. In the display processing unit 207, readout of the image data of respective pictures from the out-buffer 206 is started at the display start timing indicated by the PTS under the control of the CPU 201.

Then, in the display processing unit 207, the display repeat processing is performed at the frame rate of 60 Hz by the number of repeats specified in the field of "pic_struct" of the picture timing SEI message, and the moving image data of the frame rate of 60 Hz by the 3-2 pulldown processing is obtained. This moving image data is supplied to the display unit 208, and display at the frame rate of 60 Hz (60 Hz display) is performed in the display unit 208.

Next, the case where the reception device 200 performs display at the frame rate of 120 Hz (120 Hz display) will be described. In this case, in the CPU 201, the display start timing indicated by the PTS is appropriately corrected on the basis of the identification information (PS/PA/PB) inserted in the encoded image data of each picture and is used as the display start timing of each picture stored in the out-buffer 206.

In this case, the display start timing indicated by the PTS is used as it is as the display start timing of the picture in which the identification information "PS" is inserted. Further, as for the display start timing of the picture in which the identification information "PA" is inserted, the display start timing indicated by the PTS is shifted and corrected for use in the direction into which the display start timing is advanced by one picture, that is, 1/120 seconds, at the frame rate of 120 Hz. Further, as for the display start timing of the picture in which the identification information "PB" is inserted, the display start timing indicated by the PTS is shifted and corrected for use in the direction into which the display start timing is delayed by one picture, that is, 1/120 seconds, at the frame rate of 120 Hz.

In the display processing unit 207, readout of the image data of respective pictures from the out-buffer 206 is started at the above-described corrected display start timing under the control of the CPU 201. Then, in the display processing unit 207, the display repeat processing is performed at the frame rate of 120 Hz by five times, and the moving image data of the frame rate of 120 Hz is obtained. This moving image data is supplied to the display unit 208, and display (120 Hz display) at the frame rate of 120 Hz is performed in the display unit 208.

As described above, in the transmission/reception system 10 illustrated in FIG. 1, the transmission device 100 inserts the identification information ("PS", "PA", and "PB") indicating the synchronization relationship between the frame rate of 24 Hz and the display start timing into the encoded image data of each picture constituting the video stream of the frame rate of 60 Hz. Therefore, the reception side can easily correct the display start timing of the image data of each picture to the same state as in the case of encoding each picture constituting the moving image data of the frame rate of 24 Hz at the frame rate of 120 Hz on the basis of the identification information, performs five times of the display repeat processing for the image data of each picture to obtain the moving image data of the frame rate of 120 Hz, and can favorably perform display at the frame rate of 120 Hz (120 Hz display) without impairing the smoothness of the material of 24 Hz.

Further, in the transmission/reception system 10 illustrated in FIG. 1, the reception device 200 corrects the display start timing of the image data of each picture to the same state as in a case of encoding each picture constituting moving image data of the frame rate of 24 Hz at the frame rate of 120 Hz on the basis of the identification information ("PS", "PA", and "PB") inserted in the encoded image data of each picture, and performs five times of the display repeat processing for the image data of each picture to obtain the moving image data of the frame rate of 120 Hz. Therefore, the display at the frame rate of 120 Hz (120 Hz display) can be favorably performed without impairing the smoothness of the material of 24 Hz.

2. Modification

Note that, in the above-described embodiment, an example of inserting the identification information "PA" and "PB" in addition to the identification information "PS" into the encoded image data of each picture constituting the video stream of the frame rate of 60 Hz, as the identification information indicating the synchronization relationship between the frame rate of 24 Hz and the display start timing. However, it is conceivable to insert only the identification information "PS" and perform similar processing on the reception side without inserting the identification information "PA" and "PB".

FIG. 17(*a*) illustrates a structure example (Syntax) of the picture timing displacement SEI message in the case of inserting only the identification information "PS". FIG. 17(*b*) illustrates content (Semantics) of principal information in the structure example. In this case, there are no fields of "early display flag" and "late display flag" that exist in the structure example of the picture timing displacement SEI message illustrated in FIG. 12(*a*).

Figure 18:
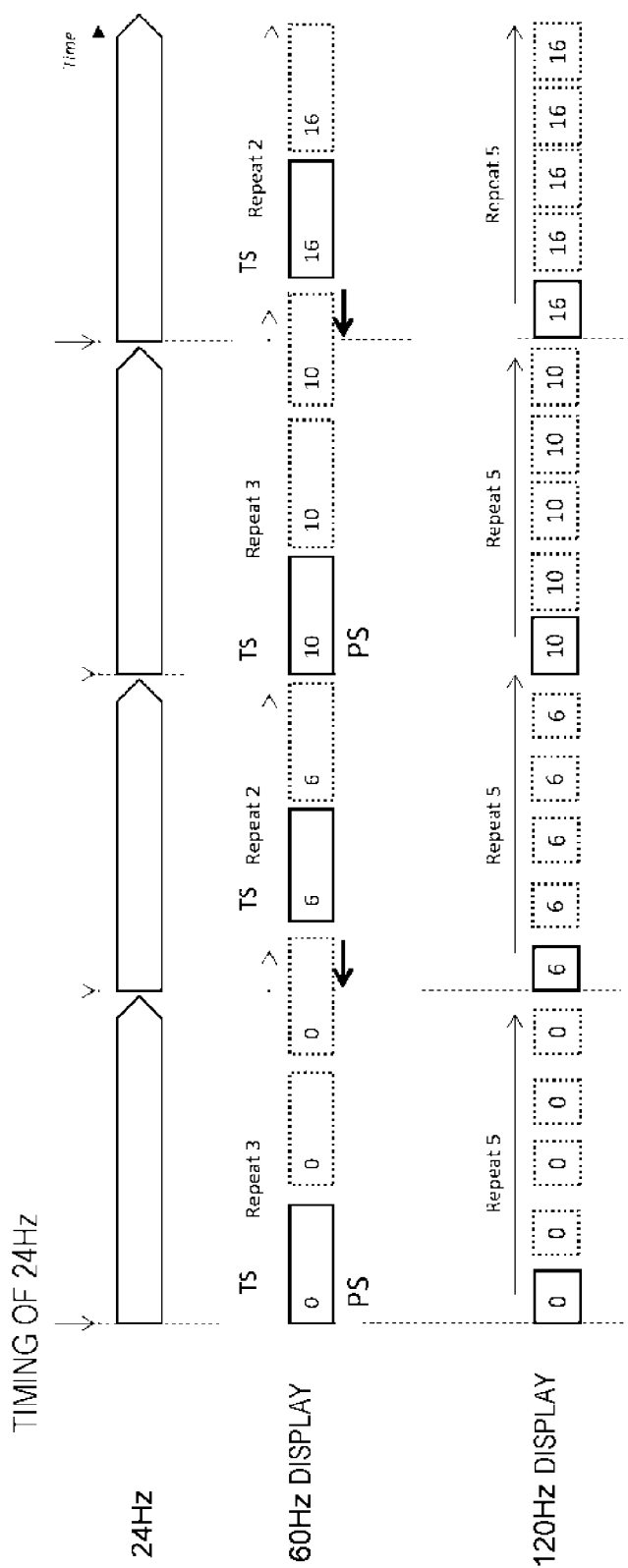
FIG. 18 is a diagram illustrating an example of the correspondence between timing of 24 Hz and the display start timing of each picture in 60 Hz display and 120 Hz display.
Figure 19:
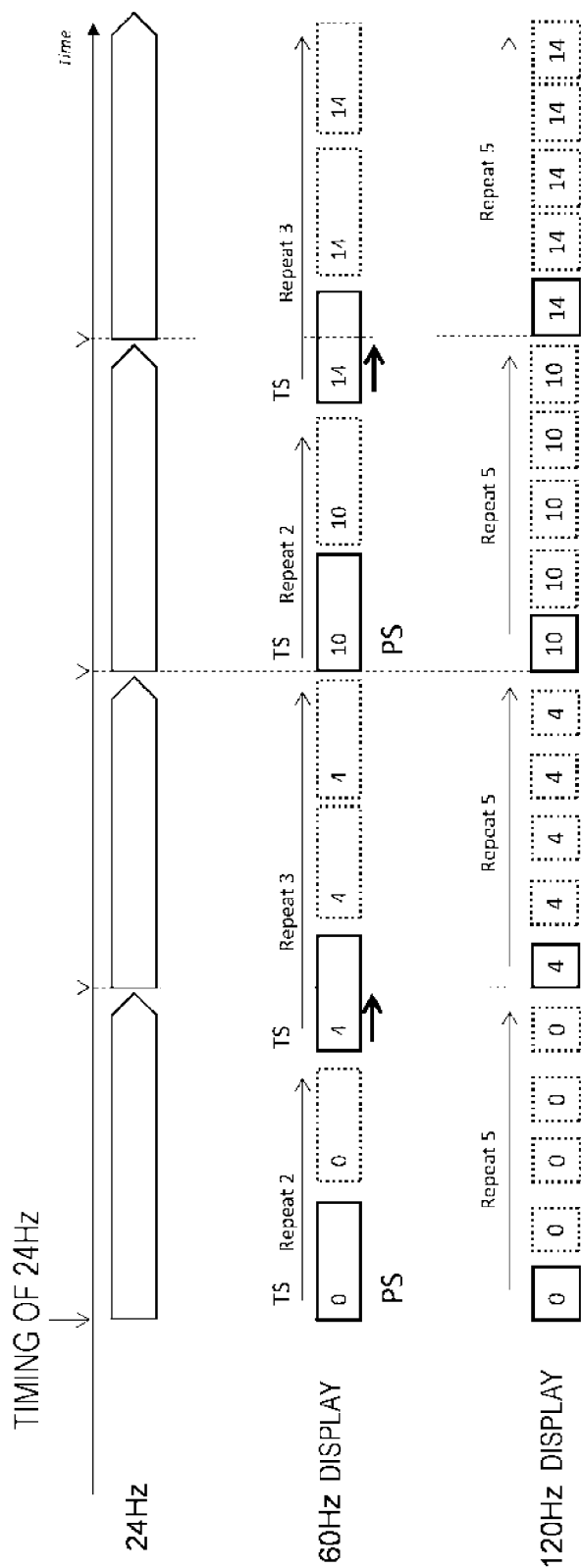
FIG. 19 is a diagram illustrating an example of the correspondence between timing of 24 Hz and the display start timing of each picture in 60 Hz display and 120 Hz display.

FIGS. 18 and 19 illustrate examples of correspondence between the timing of 24 Hz and the display start timing of each picture in 60 Hz display and 120 Hz display, similarly to FIGS. 4 and 6. In the examples of FIGS. 18 and 19, only the identification information "PS" is inserted, and the identification information "PA" and "PB" is not inserted, unlike the examples in FIGS. 4 and 6.

In the case where the identification information "PA" and "PB" exists as in the examples in FIGS. 4 and 6, in the reception device 200, whether the picture in which the identification information "PA" or "PB" is inserted is advanced or delayed from the frame rate of 24 Hz is determined on the basis of the identification information "PA" and "PB", and the display start timing of the picture is recognized to be corrected and the correction direction is determined.

For example, in the example in FIG. 4, the identification information "PA" is inserted in the I picture (the display order "6"), and in the reception device 200, delay of the display start timing of the I picture (the display order "6") from the frame rate of 24 Hz is known on the basis of the identification information "PA", and the display start timing of the I picture (the display order "6") is recognized to be corrected and the correction direction is determined to be an advancing direction.

Further, for example, in the example in FIG. 6, the identification information "PB" is inserted in the I picture (the display order "4"), and in the reception device 200, advance of the display start timing of the I picture (the display order "4") from the frame rate of 24 Hz is known on the basis of the identification information "PB", and the display start timing of the I picture (the display order "4") is recognized to be corrected and the correction direction is determined to be a delaying direction.

In the case where the identification information "PA" and "PB" does not exist as in the examples of FIGS. 18 and 19, in the reception device 200, whether the next picture is advanced or delayed from the frame rate of 24 Hz is determined on the basis of the number of repeats for the 3-2 pulldown processing specified in the "pic_struct" of the picture timing SEI message, and the display start timing of the picture is recognized to be corrected and the correction direction is determined, when the identification information "PS" is extracted in a certain picture.

For example, in the example in FIG. 18, the identification information "PS" is inserted in the B picture (the display order "0"), and the number of repeats of this picture is specified to 3. Therefore, in the reception device 200, delay of the display start timing of the I picture (the display order "6") as the next picture from the frame rate of 24 Hz is known, and the display start timing of the I picture (the display order "6") is recognized to be corrected and the correction direction is determined to be the advancing direction.

For example, in the example in FIG. 19, the identification information "PS" is inserted in the B picture (the display order "0"), and the number of repeats of this picture is specified to 2. Therefore, in the reception device 200, advance of the display start timing of the I picture (the display order "4") as the next picture from the frame rate of 24 Hz is known, and the display start timing of the I picture (the display order "4") is recognized to be corrected and the correction direction is determined to be the delaying direction.

Figure 20:
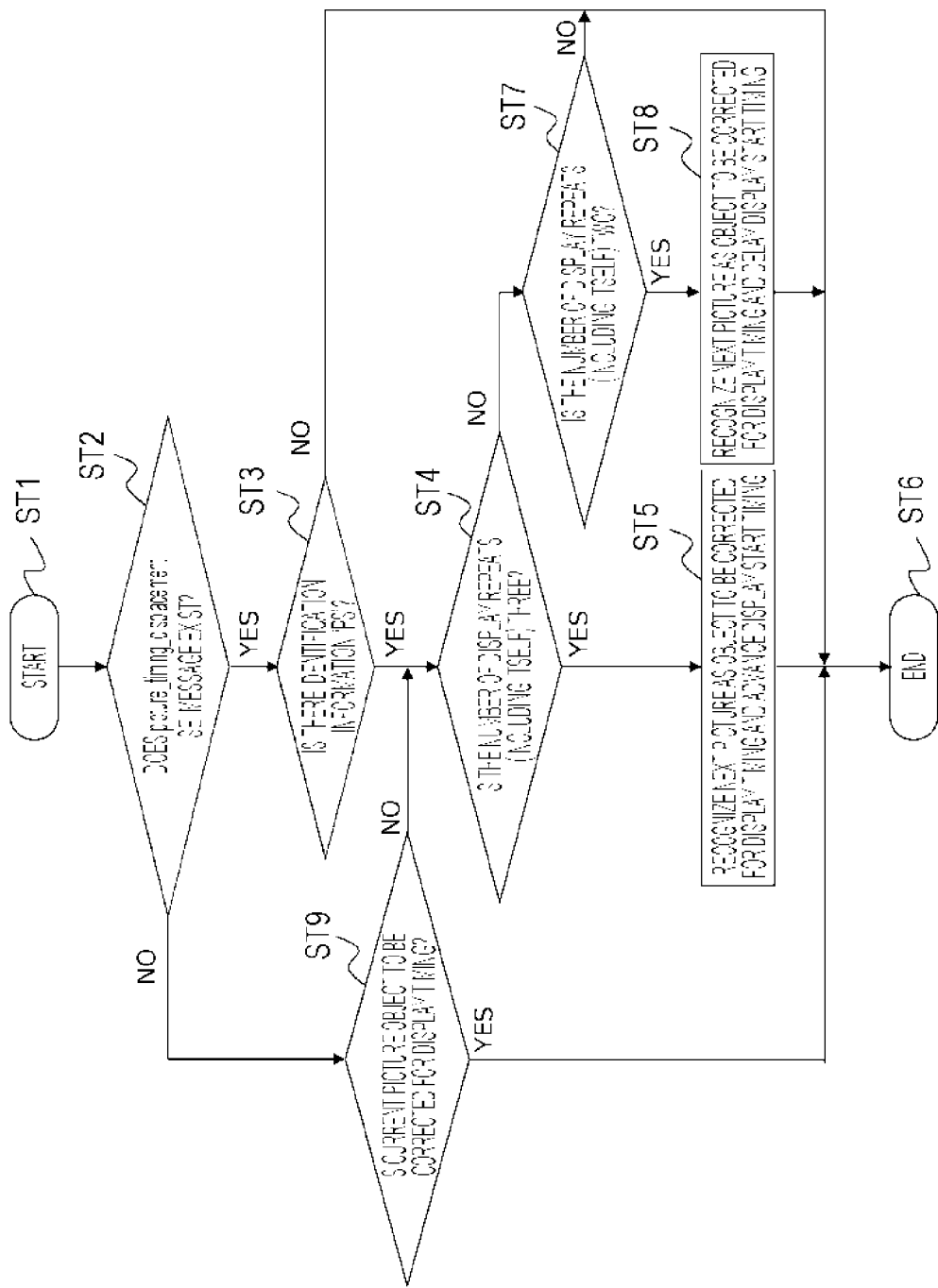
FIG. 20 is a flowchart illustrating an example of a processing procedure of recognizing a picture for which the display start timing should be corrected, and determining a correction direction (whether to advance or delay timing) in a case where only the identification information "PS" is inserted and in a case where the identification information "PS" is not inserted.

The flowchart in FIG. 20 illustrates an example of a processing procedure of recognizing a picture for which the display start timing should be corrected, and determining the correction direction (whether to advance or delay the timing) performed by the CPU 201 of the reception device 200, in the case where only the identification information "PS" is inserted and in the case where the identification information "PS" is not inserted. The processing of the flowchart is performed for each picture.

In step ST1, the CPU 201 starts the processing. Next, in step ST2, the CPU 201 determines whether the picture timing displacement SEI message exists in the current picture. When there is the picture timing displacement SEI message, in step ST3, the CPU 201 determines whether there is the identification information "PS", that is, whether "resync_to_picstruct_flag" is "1" or "0".

When there is the identification information "PS", in step ST4, the CPU 201 determines whether the number of display repeats specified in the "pic_struct" in the picture timing SEI message is 3. When the number of display repeats is 3, in step ST5, the CPU 201 recognizes that the display start timing of the next picture should be corrected as an object to be corrected, and determines the correction direction as the advancing direction. After the processing of step ST5, the CPU 201 terminates the processing in step ST6.

Further, whether the number of display repeats is not 3 in step ST4, in step ST7, the CPU 201 determines whether the number of display repeats specified in the "pic_struct" in the picture timing SEI message is 2. When the number of display repeats is 2, in step ST8, the CPU 201 recognizes that the display start timing of the next picture should be corrected as an object to be corrected, and determines the correction direction as the delaying direction. After the processing of step ST8, the CPU 201 terminates the processing in step ST6.

Further, when there is no identification information "PS" in step ST3, or when the number of display repeats is not 2 in step ST7, the CPU 201 immediately proceeds to step ST6 and terminates the processing.

Further, when there is no picture timing displacement SEI message in step ST2, in step ST9, the CPU 201 determines whether the current picture is the object to be corrected for the display timing. When the current picture is not the object to be corrected, the CPU 201 proceeds to the processing of step ST4, and performs similar processing to the above-described processing. On the other hand, when the current picture is the object to be corrected, the CPU 201 immediately proceeds to step ST6 and terminates the processing.

As is clear from the description of the flowchart in FIG. 20, even if the picture timing displacement SEI message does not exist and therefore the identification information "PS" is not inserted, the display start timing of the image data of each picture can be corrected to the same state as in the case of encoding each picture constituting the moving image data of the frame rate of 24 Hz at the frame rate of 120 Hz. Then, even in this case, the display of the frame rate of 120 Hz (120 Hz display) can be favorably performed without impairing the smoothness of the material of 24 Hz by performing five times of the display repeat processing for the image data of each picture to obtain the moving image data of the frame rate of 120 Hz.

Even if the identification information "PS" is not inserted in this manner, the display start timing of the image data of each picture can be corrected. In the case where there is insertion of the identification information "PS", when handling a plurality of video streams of the frame rate of 60 Hz, occurrence of a gap between a plurality of streams can be prevented at the stage of timing correction, and synchronous display of the plurality of video streams of the frame rate of 120 Hz can be guaranteed.

Figure 21:
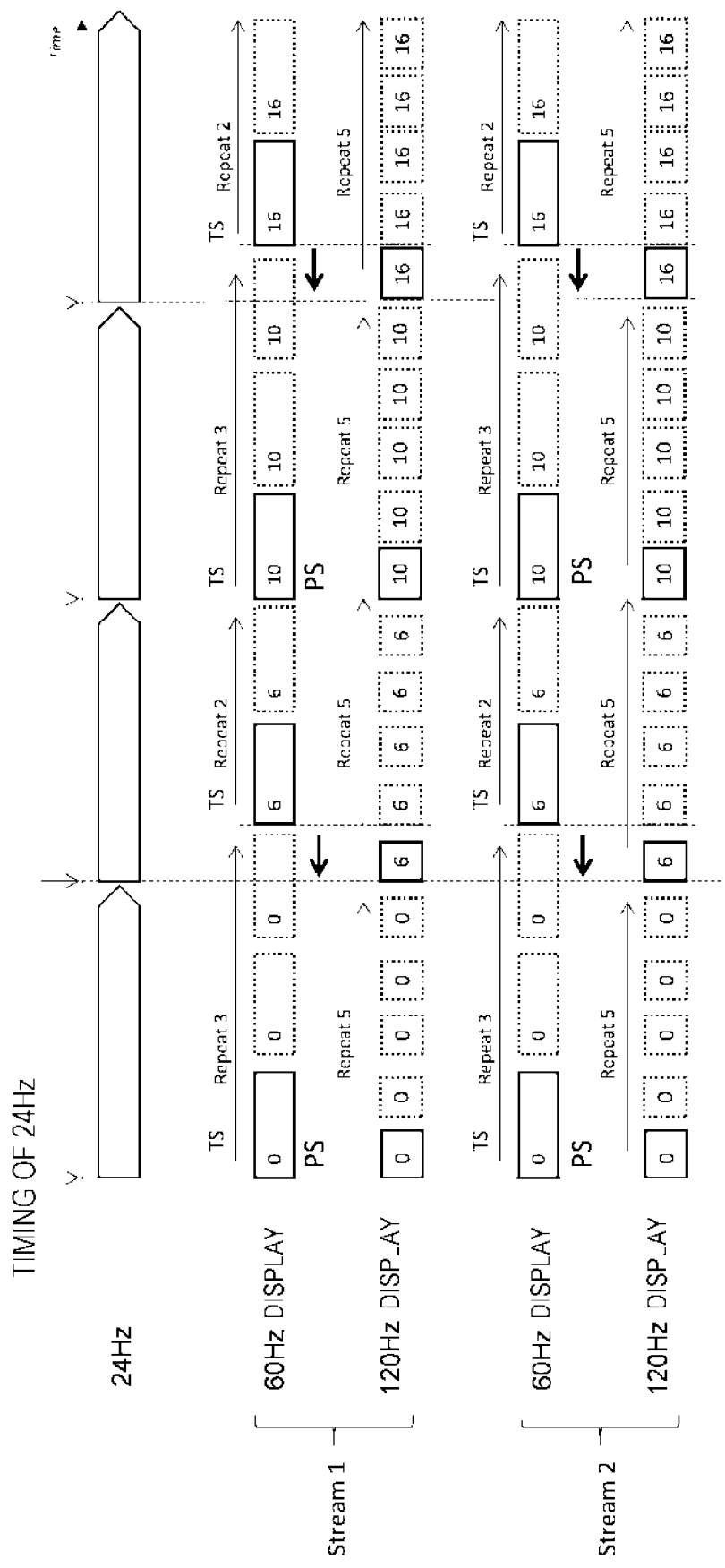
FIG. 21 is a diagram illustrating an example of a case of handling two video streams of the frame rate of 60 Hz and a case of having the insertion of the identification information "PS".

FIG. 21 illustrates an example of the case of handling two video streams of the frame rate of 60 Hz and the case of having the insertion of the identification information "PS". In this case, corresponding pictures for which the display start timing is corrected are specified in a stream 1 (Stream 1) and in a stream 2 (Stream 2) due to the insertion of the identification information "PS". Therefore, there is no gap between the two streams at the stage of timing correction, and synchronous display of the two streams at the frame rate of 120 Hz becomes possible.

Figure 22:
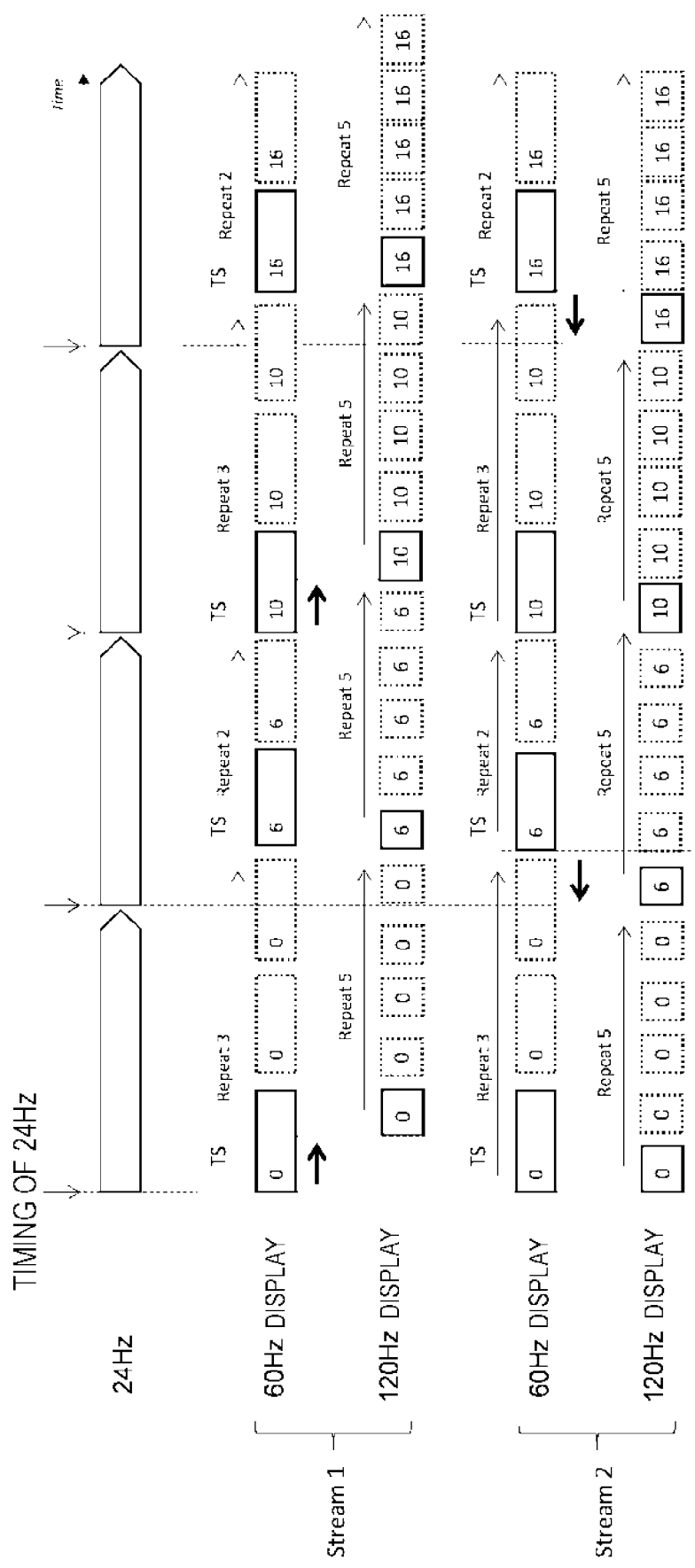
FIG. 22 is a diagram illustrating an example of a case of handling two video streams of the frame rate of 60 Hz and a case of having no insertion of the identification information "PS".

FIG. 22 illustrates an example of the case of handling two video streams of the frame rate of 60 Hz and the case of having no insertion of the identification information "PS". In the case of performing 60 Hz display, the two streams are synchronized with each other by the display time stamp TS. In this case, pictures for which the display start timing is corrected as the objects to be corrected may not be the same in the stream 1 (Stream 1) and in the stream 2 (Stream 2) at the stage of display start timing correction for 120 Hz display, as described in FIG. 22, due to no insertion of the identification information "PS". In this case, synchronous display of the two video streams at the frame rate of 120 Hz is not possible.

Further, the present technology can also have the following configurations.

(1) A transmission device including:
an encoding unit configured to encode each picture constituting moving image data of a first frame rate at a second frame rate larger than the first frame rate to obtain a video stream of the second frame rate;
an information insertion unit configured to insert identification information indicating a synchronization relationship between the first frame rate and display start timing into encoded image data of the each picture constituting the video stream of the second frame rate; and
a transmission unit configured to transmit the video stream of the second frame rate in which the identification information is inserted.

(2) The transmission device according to (1), in which
the identification information indicating a synchronization relationship includes
identification information indicating whether being in synchronization with the first frame rate.

(3) The transmission device according to (2), in which
the identification information indicating a synchronization relationship further includes
identification information indicating whether being advanced or delayed from the first frame rate when not being in synchronization with the first frame rate.

(4) The transmission device according to any one of (1) to (3), in which
the first frame rate is 24 Hz and the second frame rate is 60 Hz, or the first frame rate is 48 Hz and the second frame rate is 120 Hz.

(5) The transmission device according to any one of (1) to (4), in which
the information insertion unit inserts
an SEI message including the identification information into the video stream of the second frame rate.

(6) A transmission method including:
an encoding step of encoding each picture constituting moving image data of a first frame rate at a second frame rate larger than the first frame rate to obtain a video stream of the second frame rate;
an information insertion step of inserting identification information indicating a synchronization relationship between the first frame rate and display start timing into encoded image data of the each picture constituting the video stream of the second frame rate; and
a transmission step of transmitting, by a transmission unit, the video stream of the second frame rate in which the identification information is inserted.

(7) A reception device including:
a reception unit configured to receive a video stream of a second frame rate larger than a first frame rate, the video stream having been obtained by encoding each picture constituting moving image data of the first frame rate at the second frame rate, and
the reception device further including:
a control unit configured to control decoding processing of decoding encoded image data of the each picture constituting the video stream of the second frame rate to obtain image data of the each picture, timing correction processing of correcting display start timing of the image data of the each picture to a same state as in a case of encoding the each picture constituting the moving image data of the first frame rate at a third frame rate larger than the second frame rate and N times (N is an integer) the first frame rate, and display repeat processing of repeatedly outputting the image data of the each picture with the corrected display start timing at the third frame rate by the number of N times.

(8) The reception device according to (7), in which
identification information indicating a synchronization relationship between the first frame rate and the display start timing is inserted in the encoded image data of the each picture constituting the video stream of the second frame rate, and
the control unit controls the timing correction processing on the basis of the identification information indicating a synchronization relationship.

(9) The reception device according to (9), in which
the identification information indicating a synchronization relationship includes
identification information indicating whether being in synchronization with the first frame rate.

(10) The reception device according to (9), in which
the identification information indicating a synchronization relationship further includes
identification information indicating whether being advanced or delayed from the first frame rate when not being in synchronization with the first frame rate.

(11) The reception device according to any one of (7) to (10), in which
the first frame rate is 24 Hz, the second frame rate is 60 Hz, the third frame rate is 120 Hz, and the N is 5, the first frame rate is 24 Hz, the second frame rate is 60 Hz, the third frame rate is 240 Hz, and the N is 10, or the first frame rate is 48 Hz, the second frame rate is 120 Hz, the third frame rate is 240 Hz, and the N is 5.

(12) A reception method including:
a reception step of receiving, by a reception unit, a video stream of a second frame rate larger than a first frame rate, the video stream having been obtained by encoding each picture constituting moving image data of the first frame rate at the second frame rate, and
the reception method further including:
a decoding step of decoding encoded image data of the each picture constituting the video stream of the second frame rate to obtain image data of the each picture;
a correction step of correcting display start timing of the image data of the each picture to a same state as in a case of encoding the each picture constituting the moving image data of the first frame rate at a third frame rate larger than the second frame rate and N times (N is an integer) the first frame rate; and
a display repeat step of repeatedly outputting the image data of the each picture with the corrected display start timing at the third frame rate by the number of N times.

A principal characteristic of the present technology is enabling the reception side to easily correct the display start timing of the image data of each picture to the same state as in a case of encoding each picture constituting moving image data of the frame rate of 24 Hz at the frame rate of 120 Hz to favorably perform the display at the frame rate of 120 Hz (120 Hz display) without impairing the smoothness of the material of 24 Hz by inserting the identification information indicating the synchronization relationship between the frame rate of 24 Hz and the display start timing to the encoded image data of each picture constituting the video stream of the frame rate of 60 Hz (see FIGS. 4 and 6).

REFERENCE SIGNS LIST

10 Transmission/reception system
100 Transmission device
101 CPU
102 Encoder
102a Video encoder
102b Detection unit
103 Multiplexer
104 Transmission unit
200 Reception device
201 CPU
202 Reception unit
203 Demultiplexer
204 In-buffer
205 Decoder
206 Out-buffer
207 Display processing unit
208 Display unit

The invention claimed is:

1. A transmission device comprising:
circuitry configured to
encode each picture constituting moving image data of a first frame rate at a second frame rate larger than the first frame rate to obtain a video stream of the second frame rate;
insert identification information into encoded image data of the each picture constituting the video stream of the second frame rate, the identification information indicating whether display start timing of the respective picture is delayed by one frame of the second frame rate or advanced by one frame of the second frame rate with respect to timing of the first frame rate; and
transmit the video stream of the second frame rate in which the identification information is inserted.

2. The transmission device according to claim 1, wherein the identification information for at least one picture indicating that the display start timing of the respective picture is synchronized with respect to the first frame rate.

3. The transmission device according to claim 1, wherein the first frame rate is 24 Hz and the second frame rate is 60 Hz, or the first frame rate is 48 Hz and the second frame rate is 120 Hz.

4. The transmission device according to claim 1, wherein the circuitry is further configured to insert a supplemental enhancement information (SEI) message including the identification information into the video stream of the second frame rate.

5. A transmission method comprising:
encoding each picture constituting moving image data of a first frame rate at a second frame rate larger than the first frame rate to obtain a video stream of the second frame rate;
inserting identification information into encoded image data of the each picture constituting the video stream of the second frame rate, the identification information indicating whether display start timing of the respective picture is delayed by one frame of the second frame rate or advanced by one frame of the second frame rate with respect to timing of the first frame rate; and
transmitting, by a transmitter, the video stream of the second frame rate in which the identification information is inserted.

6. A reception device comprising:
circuitry configured to
receive a video stream of a second frame rate larger than a first frame rate, the video stream having been obtained by encoding each picture constituting moving image data of the first frame rate at the second frame rate,
extracting from the received video stream identification information of each picture constituting the video stream of the second frame rate, the identification information indicating whether display start timing of the respective picture is delayed by one frame of the second frame rate or advanced by one frame of the second frame rate with respect to timing of the first frame rate,
control decoding processing of decoding encoded image data of the each picture constituting the video stream of the second frame rate to obtain image data of the each picture,
control timing correction processing of correcting display start timing of the image data of the each picture by delaying or advancing display start timing of the image data of at least one picture based on the extracted identification information corresponding to the respective pictures, and
display repeat processing of repeatedly outputting the image data of the each picture with the corrected display start timing.

7. The reception device according to claim 6, wherein the identification information for at least one picture indicating that the display start timing of the respective picture is synchronized with respect to the first frame rate.

8. The reception device according to claim 6, wherein the first frame rate is 24 Hz, the second frame rate is 60 Hz, the third frame rate is 120 Hz, and the N is 5, the first frame rate is 24 Hz, the second frame rate is 60 Hz, the third frame rate is 240 Hz, and the N is 10, or the first frame rate is 48 Hz, the second frame rate is 120 Hz, the third frame rate is 240 Hz, and the N is 5.

9. A reception method comprising:
receiving, by a receiver, a video stream of a second frame rate larger than a first frame rate, the video stream having been obtained by encoding each picture constituting moving image data of the first frame rate at the second frame rate,
extracting from the received video stream identification information of each picture constituting the video stream of the second frame rate, the identification information indicating whether display start timing of the respective picture is delayed by one frame of the second frame rate or advanced by one frame of the second frame rate with respect to timing of the first frame rate,
decoding encoded image data of the each picture constituting the video stream of the second frame rate to obtain image data of the each picture;
correcting display start timing of the image data of the each picture by delaying or advancing display start timing of the image data of at least one picture based on the extracted identification information corresponding to the respective pictures; and
repeatedly outputting the image data of the each picture with the corrected display start timing.

* * * * *